United States Patent
Sharma et al.

(10) Patent No.: US 11,907,359 B2
(45) Date of Patent: *Feb. 20, 2024

(54) EVENT-BASED USER STATE SYNCHRONIZATION IN A LOCAL CLOUD OF A CLOUD STORAGE SYSTEM

(71) Applicant: Egnyte, Inc., Mountain View, CA (US)

(72) Inventors: Shishir Sharma, Mountain View, CA (US); Debjit Bhattacharjee, Dublin, CA (US); Amrit Jassal, Morgan Hill, CA (US); Kalpesh Patel, Flower Mound, TX (US); Deepak Mehta, Surat (IN); Przemek Grzedzielski, Poznan (PL); Sachin Shetty, Mumbai (IN); Krzysztof Gardo, Poznan (PL); Daniil Iaitskov, Poznan (PL); Harikesavan Krishnan, San Jose, CA (US); Manish Marathe, San Jose, CA (US)

(73) Assignee: Egnyte, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/890,654

(22) Filed: Aug. 18, 2022

(65) Prior Publication Data

US 2023/0117023 A1 Apr. 20, 2023

Related U.S. Application Data

(60) Continuation of application No. 15/808,425, filed on Nov. 9, 2017, now Pat. No. 11,449,596, which is a
(Continued)

(51) Int. Cl.
*G06F 16/27* (2019.01)
*G06F 21/45* (2013.01)

(52) U.S. Cl.
CPC .............. *G06F 21/45* (2013.01); *G06F 16/27* (2019.01)

(58) Field of Classification Search
CPC .................................. G06F 16/27; G06F 21/45
See application file for complete search history.

(56) References Cited

U.S. PATENT DOCUMENTS 5,388,255 A * 2/1995 Pytlik ............... G06F 16/24539
5,832,211 A * 11/1998 Blakley, III ............ G06F 21/46
726/6

(Continued)

OTHER PUBLICATIONS

Fu et al. *Synchronizing Namespaces with Invertible Bloom Filters.* 2015 ACM/IEEE Symposium on Architectures for Networking and Communications Systems (ANCS) May 7, 2015 (pp. 123-134). IEEE. (Year: 2015).
(Continued)

*Primary Examiner* — Neveen Abel Jalil
*Assistant Examiner* — Hubert Cheung
(74) *Attorney, Agent, or Firm* — Larry E. Henneman, Jr.; Henneman & Associates, PLC

(57) ABSTRACT

Cloud storage systems and methods are described for providing event-based user state synchronization among the various cloud elements. A global user directory is maintained on a remote cloud storage system. The global user directory includes a plurality of global user definitions associated with a plurality of user accounts, where each of the user accounts has access to at least one of a remote file system hosted by the remote cloud storage system and a local file system hosted by a local cloud storage system. As global user definition are altered on the remote cloud storage system, user events are generated and communicated to the local cloud storage system, where they are applied to synchronize the local user definitions with the global user definitions. The invention facilitates centralized control of
(Continued)

user definitions, near real-time event delivery to local cloud storage systems, and separation of authentication processes from customers' active directory services.

20 Claims, 24 Drawing Sheets

Related U.S. Application Data division of application No. 15/388,038, filed on Dec. 22, 2016, now abandoned.

(60) Provisional application No. 62/271,133, filed on Dec. 22, 2015.

(56) References Cited

U.S. PATENT DOCUMENTS

| | | | | |
|---|---|---|---|---|
| 6,847,993 | B1* | 1/2005 | Novaes | G06F 9/5061 |
| | | | | 714/48 |
| 7,100,195 | B1* | 8/2006 | Underwood | H04L 63/0823 |
| | | | | 707/999.009 |
| 7,660,830 | B2* | 2/2010 | Ordille | G06F 16/278 |
| | | | | 707/623 |
| 7,945,652 | B2* | 5/2011 | Tsao | H04L 41/12 |
| | | | | 709/225 |
| 8,311,980 | B2* | 11/2012 | Saito | G06F 16/184 |
| | | | | 707/610 |
| 9,558,341 | B1* | 1/2017 | Allababidi | G06F 21/45 |
| 10,380,076 | B2* | 8/2019 | Wijayaratne | G06F 16/16 |
| 11,144,510 | B2* | 10/2021 | Sharma | G06F 16/178 |
| 2003/0153302 | A1* | 8/2003 | Lewis | H04L 69/329 |
| | | | | 455/466 |
| 2004/0068523 | A1* | 4/2004 | Keith, Jr. | G06F 16/1787 |
| 2006/0004765 | A1* | 1/2006 | Anderson | G06F 16/10 |
| 2006/0247964 | A1* | 11/2006 | Baturytski | G06F 11/3664 |
| | | | | 705/7.26 |
| 2006/0293034 | A1* | 12/2006 | Armstrong | H04L 63/168 |
| | | | | 455/414.1 |
| 2007/0185932 | A1* | 8/2007 | Teodosiu | G06F 16/184 |
| 2007/0271280 | A1* | 11/2007 | Chandasekaran | G06F 9/542 |
| 2007/0283443 | A1* | 12/2007 | McPherson | G06F 21/6218 |
| | | | | 726/28 |
| 2009/0037492 | A1* | 2/2009 | Baitalmal | H04L 67/34 |
| 2009/0094252 | A1* | 4/2009 | Wong | H04L 67/1095 |
| 2009/0327854 | A1* | 12/2009 | Chhajer | G06F 16/217 |
| | | | | 715/227 |
| 2010/0077026 | A1* | 3/2010 | Watanabe | H04L 63/10 |
| | | | | 726/4 |
| 2010/0241668 | A1* | 9/2010 | Susanto | G06F 21/305 |
| | | | | 707/784 |
| 2011/0218964 | A1* | 9/2011 | Hagan | G06F 16/27 |
| | | | | 707/694 |
| 2011/0307442 | A1* | 12/2011 | Sharma | G06F 16/172 |
| | | | | 707/611 |
| 2012/0179653 | A1* | 7/2012 | Araki | G06F 16/27 |
| | | | | 707/634 |
| 2013/0041918 | A1 | 2/2013 | Landais | |
| 2013/0086060 | A1* | 4/2013 | Donley | G06F 21/31 |
| | | | | 707/736 |
| 2013/0124638 | A1* | 5/2013 | Barreto | H04L 65/403 |
| | | | | 709/205 |
| 2013/0138608 | A1* | 5/2013 | Smith | G06F 16/27 |
| | | | | 707/610 |
| 2013/0226876 | A1* | 8/2013 | Gati | G06F 16/184 |
| | | | | 707/652 |
| 2013/0282657 | A1* | 10/2013 | Besen | G06F 16/1844 |
| | | | | 707/625 |
| 2014/0006354 | A1* | 1/2014 | Parkison | G06F 16/183 |
| | | | | 707/661 |
| 2014/0006357 | A1* | 1/2014 | Davis | G06F 3/067 |
| | | | | 707/667 |
| 2014/0006465 | A1* | 1/2014 | Davis | G06F 16/1752 |
| | | | | 707/827 |
| 2014/0007239 | A1* | 1/2014 | Sharpe | G06F 16/183 |
| | | | | 726/24 |
| 2014/0040196 | A1* | 2/2014 | Wijayaratne | G06F 16/178 |
| | | | | 707/624 |
| 2014/0040197 | A1* | 2/2014 | Wijayaratne | G06F 16/178 |
| | | | | 707/625 |
| 2014/0122427 | A1* | 5/2014 | Dary | G06F 16/20 |
| | | | | 707/E17.005 |
| 2014/0129273 | A1* | 5/2014 | Versteeg | G06F 21/62 |
| | | | | 705/7.14 |
| 2014/0149461 | A1* | 5/2014 | Wijayaratne | G06F 16/182 |
| | | | | 707/783 |
| 2014/0195485 | A1* | 7/2014 | Dorman | G06F 16/178 |
| | | | | 707/624 |
| 2014/0372376 | A1* | 12/2014 | Smith | G06F 16/273 |
| | | | | 707/624 |
| 2015/0200943 | A1* | 7/2015 | Pitre | G06F 21/604 |
| | | | | 726/1 |
| 2015/0326454 | A1* | 11/2015 | Geis | H04L 67/1036 |
| | | | | 709/226 |
| 2017/0124111 | A1* | 5/2017 | Sharma | G06F 16/178 |
| 2017/0351700 | A1 | 12/2017 | Takata et al. | |
| 2018/0018347 | A1 | 1/2018 | Yokoi et al. | |
| 2018/0046644 | A1* | 2/2018 | Smith | G06F 16/178 |
| 2018/0150476 | A1* | 5/2018 | Koos | G06F 16/11 |
| 2020/0073854 | A1* | 3/2020 | Wijayaratne | H04L 67/1095 |

OTHER PUBLICATIONS

Lindlom et al. *FileSync/NDN: Peer-to-Peer File Sync over Named Data Networking*. NDN Technical Report NDN-0012, Mar. 1-6, 2013.
U.S. Appl. No. 17/480,891, Office Action dated Jul. 18, 2023.

* cited by examiner

| Action on Global User Directory | Effect on Local User Directory |
|---|---|
| Create Power User | User Also Created Locally |
| Sync Password with Local Devices | Password Updated for Local User |
| Change Password for Power User | Password Invalidated for Local User |
| Change User Role from Limited to Power User | User is Created Locally |
| Delete Power User | User is Disabled Locally |
| Deactivate Power User | User is Disabled Locally |
| Change User Role From Power to Limited User | User is Disabled Locally |
| Enable Power User | User is Enabled Locally |
| Forgot Password | Password Invalidated for Local User |
| Password Reset for User by Administrator | Password Invalidated for Local User |
| Password Reset by Cloud Security Policy (e.g. Passwords Expire Every 30 Days) | Password Invalidated for Local User |
| Any Action on a Limited User Except Change in the User Role | No Action Performed Locally |

FIG. 14

EVENT-BASED USER STATE SYNCHRONIZATION IN A LOCAL CLOUD OF A CLOUD STORAGE SYSTEM

RELATED APPLICATIONS

This application is a continuation of co-pending U.S. patent application Ser. No. 15/808,425, filed Nov. 9, 2017 by at least one common inventor, which is a divisional of U.S. patent application Ser. No. 15/388,038, filed on Dec. 22, 2016 by at least one common inventor, which claims the benefit of U.S. Provisional Patent Application Ser. No. 62/271,133, filed on Dec. 22, 2015 by at least one common inventor, each of which is incorporated by reference herein in its entirety.

BACKGROUND OF THE INVENTION

Field of the Invention

This invention relates generally to cloud computing systems, and more particularly to synchronizing the states of user definitions in a cloud computing system.

Description of the Background Art

Cloud computing systems are known. In cloud computing systems, computing and storage services are provided to remote clients over a wide area network such as the Internet. In the case of storage, the customer's file system can exist both in a local storage device (e.g., on a hard drive, on a network attached storage (NAS) device, etc.) and in the cloud. For example, a backup copy of the customer's local file system can be stored in the cloud for both data protection and remote access.

User accounts are often established to define who can access the synchronized local and/or remote file systems. However, the customer must register (e.g., set up) each user's account for local access at each of the local storage devices themselves. This is resource intensive (e.g., in terms of IT personnel, time, etc.) and undesirable. It is also slow and can leave the local file system vulnerable to prohibited access (e.g., the time between when a user's employment is terminated and when the user's account is locally deactivated, etc.).

Moreover, oftentimes a customer will have an active directory service (e.g., at its headquarters) that defines user accounts that are able to access its file systems. In such a case, each local user will require authentication with the customer's active directory service before the local user can be granted access to the synchronized local file system. Unfortunately, if a connection with the active directory service cannot be established due to the corporate policies, then the user will be denied local access. Thus, the synchronized namespace on the local storage device cannot be accessed in off-line mode.

SUMMARY

The present invention overcomes the problems associated with the prior art by providing a system and method for synchronizing user state information between a remote file storage system and each associated local file storage system. The invention facilitates maintaining separate, but synchronized, user directories on the remote file storage system (the cloud) and any number of associated local file storage systems. The invention also facilitates synchronizing the user directories in near-real time through event-based synchronization facilitated by persistent Web Socket connections.

A method for synchronizing global user definitions of a remote file storage system with local user definitions of at least one local file storage system includes maintaining a global user directory comprising a plurality of global user definitions associated with a plurality of user accounts, each of the user accounts having access to at least one of a remote file system (RFS) hosted by the remote file storage system and a local file system (LFS) hosted by the local file storage system. The method also includes altering a global user definition associated with a particular user account, the particular user account having access to the LFS, generating a user event indicative of the altered global user definition, and providing the user event to the local file storage system.

A particular method further includes establishing a connection with a subscriber directory service maintained by a subscriber associated with the plurality of user accounts and importing at least some of the global user definitions from the subscriber directory service. A more particular method includes mapping user definitions of the subscriber directory service to associated global user definitions in the global user directory as part of importing at least some of the global user definitions from the subscriber directory service.

Another particular method includes generating the user event is if a new global user definition indicative of a new user account is created in the global user directory, an existing global user definition is deactivated, or a password associated with one of the global user definitions is changed.

Yet another particular method includes generating the user event only if the particular user account has access to the LFS. Another particular method includes establishing a connection with a real time event delivery (RED) service and sending a message indicative of the user event to the RED service as part of providing the user event to the local file storage system, where the RED service is configured to establish a separate connection with the local file storage system.

A remote file storage system is configured to synchronize global user definitions of the remote file storage system with local user definitions of at least one local file storage system and includes a processing unit configured to execute code, a wide area network (WAN) adapter, and memory for storing data and the code. The data and the code include a global user directory comprising a plurality of global user definitions associated with a plurality of user accounts having access to at least one of a remote file system (RFS) hosted by the remote file storage system and a local file system (LFS) hosted by the local file storage system, a directory services module operative to alter a global user definition associated with a particular user account having access to the LFS, a user state synchronizer operative to generate a user event indicative of the altered global user definition, and a user event interface operative to provide the user event to the local file storage system.

In a particular system, the code also includes a subscriber directory synchronizer operative to establish a connection with a subscriber directory service maintained by a subscriber associated with the plurality of user accounts and import at least some of the global user definitions from the subscriber directory service. In a more particular system, the subscriber directory synchronizer is further configured to map user definitions of the subscriber directory service to associated global user definitions of the global user directory.

In another particular system, the user state synchronizer generates the user event if a new global user definition indicative of a new user account is created in the global user directory, an existing global user definition is deactivated, or a password associated with one of the global user definitions is changed.

In yet another particular system the user state synchronizer is configured to generate the user event only if the particular user account has access to the LFS.

In another particular system, the user event interface is configured to establish a connection with a real time event delivery (RED) service. The RED service is configured to provide the user event to the local file storage system via a separate connection with the local file storage system.

A method for synchronizing local user definitions of a local file storage system with global user definitions of a remote file storage system includes maintaining a plurality of local user definitions associated with a plurality of local user accounts having access to a local file system (LFS) hosted by the local file storage system. The method also includes communicating with the remote file storage system, which maintains a global user directory comprising a plurality of global user definitions associated with a plurality of global user accounts. Each of the global user accounts has access to at least one of a remote file system (RFS) hosted by the remote file storage system and the LFS and each of the local user definitions corresponds to one of the global user definitions. The method also includes receiving a user event, which includes information indicative of a change made to an altered global user definition and altering a corresponding one of the local user definitions based on the user event to synchronize the corresponding local user definition and the altered global user definition.

In a particular method, the plurality of local user accounts includes a subset of the global user accounts. Another particular method includes reading at least some headquarter (HQ) user definitions from a subscriber directory service maintained by a subscriber associated with the local file storage system and providing at least some of the HQ user definitions to the remote file storage system, wherein each of the local user definitions and at least some of the global user definitions correspond to ones of the HQ user definitions.

In yet another particular method, the user event originates at the remote file storage system. In a more particular method the step of receiving the user event includes establishing a connection with a real time event delivery (RED) service and receiving the user event from the RED service. An even more particular method includes generating a reply message responsive to receiving the user event and providing the reply message to the RED service.

Another particular method includes receiving the local user definitions from the remote file storage system and storing the local user definitions on the local file storage system. In yet another particular method, the user event is indicative of a new global user definition being created in the global user directory, a user account associated with an existing global user definition being deactivated, or a password associated with one of the global user definitions being changed.

A local file storage system is configured to synchronize local user definitions of the local file storage system with global user definitions of a remote file storage system and includes a processing unit configured to execute code, a wide area network (WAN) adapter, and memory for storing data and the code. The data and the code include a local user directory configured to maintain a plurality of local user definitions associated with a plurality of local user accounts, which have access to a local file system (LFS) hosted by the local file storage system, a local user state synchronizer configured to communicate with the remote file storage system maintaining a global user directory, and an event delivery interface configured to receive a user event including information indicative of a change made to an altered global user definition. The global user directory includes a plurality of global user definitions associated with a plurality of global user accounts that have access to at least one of a remote file system (RFS) hosted by the remote file storage system and the LFS, and each of the local user definitions corresponds to one of the global user definitions. The local user state synchronizer is further configured to alter a corresponding one of the local user definitions based on the user event to synchronize the corresponding local user definition and the altered global user definition.

In a particular system, the plurality of local user accounts comprises a subset of the global user accounts. Another particular system includes a headquarter (HQ) user directory exporter configured to read at least some HQ user definitions from a subscriber directory service maintained by a subscriber associated with the local file storage system and provide at least some of the HQ user definitions to the remote file storage system. Each of the local user definitions and at least some of the global user definitions correspond to ones of the HQ user definitions.

In another particular system, the user event originates at the remote file storage system. In a more particular system, the event delivery interface is configured to establish a connection with a real time event delivery (RED) service, which is configured to establish a separate connection with the remote file storage system, and receive the user event from the RED service. In an even more particular system, the local user state synchronizer is further configured to generate a reply message responsive to applying the user event to the corresponding local user definition.

In yet another particular system, the local user state synchronizer is configured to generate the local user definitions responsive to receiving events from the remote file storage system. In another particular system, the user event is indicative of a new global user definition being created in the global user directory, a user account associated with an existing global user definition being deactivated, or a password associated with one of the global user definitions being changed.

A method for synchronizing user states over a plurality of storage systems of a hybrid cloud system includes maintaining a remote cloud storage system for storing a remote file system (RFS) associated with a plurality of subscribers. The method also includes deploying a first hybrid cloud application on a first local storage system associated with a particular subscriber and located remotely from the remote cloud storage system, and hosting a first local file system (LFS) and deploying a second hybrid cloud application on a second local storage system associated with the particular subscriber, hosting a second LFS, and being located remotely from the remote cloud storage system and the first local storage system. Additionally, the method includes synchronizing a first set of cloud user definitions stored on the remote cloud storage system and a first set of local user definitions stored on the first local storage system and synchronizing a second set of cloud user definitions stored on the remote cloud storage system and a second set of local user definitions stored on the second local storage system.

In a particular method, the steps of synchronizing the first set of cloud user definitions and the first set of local user definitions and synchronizing the second set of cloud user definitions and the second set of local user definitions include detecting a change to at least one of said first set and said second set of cloud user definitions, generating a user event responsive to the change, and communicating the user event to at least one of the first local storage system and the second local storage system depending on which of the first set of cloud user definitions and the second set of cloud user definitions is associated with the particular cloud user definition. In a more particular method the step of generating the user event includes generating the user event responsive to a new cloud user definition being created or an existing cloud user definition being deactivated or altered.

Another particular method includes providing headquarter (HQ) user definitions associated with the particular subscriber to the remote cloud storage system and generating at least some of the first and the second sets of cloud user definitions based on the HQ user definitions. A more particular method includes creating the first and the second sets of local user definitions responsive to the first and the second sets of cloud user definitions being generated. Another more particular method includes deploying user directory software to a system associated with the particular subscriber and storing the HQ user definitions. In such a method, the user directory software is configured to scan the HQ user definitions and provide at least some of the HQ user definitions to the remote cloud storage system.

A method for routing user events in a cloud computing system is also disclosed. The method includes providing a wide area network interface configured to establish persistent connections with a plurality of local cloud storage systems, establishing a plurality of persistent connections with the plurality of local cloud storage systems, and registering each of the persistent connections in a connections registry. The method further includes the steps of using the connections registry to select at least one of the local cloud storage systems as a destination for a user event that is indicative of an altered cloud user definition on a remote cloud storage system, receiving the user event from the remote cloud storage system, and providing the user event to the destination. Real-time event delivery (RED) systems are also disclosed.

BRIEF DESCRIPTION OF THE DRAWINGS

The present invention is described with reference to the following drawings, wherein like reference numbers denote substantially similar elements:

FIG. 14 is a table showing relationships between actions on global users on the remote cloud server of FIG. 1 and corresponding local user effects on the local clouds of FIG. 1;

DETAILED DESCRIPTION

The present invention overcomes the problems associated with the prior art by providing a system and method for centralized control and synchronization of states of user definitions in a hybrid cloud storage system. In the following description, numerous specific details are set forth (e.g., specific communication protocols, data structures, etc.) in order to provide a thorough understanding of the invention. Those skilled in the art will recognize, however, that the invention may be practiced apart from these specific details. In other instances, details of well known cloud computing practices (e.g., routine optimization, file system protocols, etc.) and components have been omitted, so as not to unnecessarily obscure the present invention.

Figure 1:
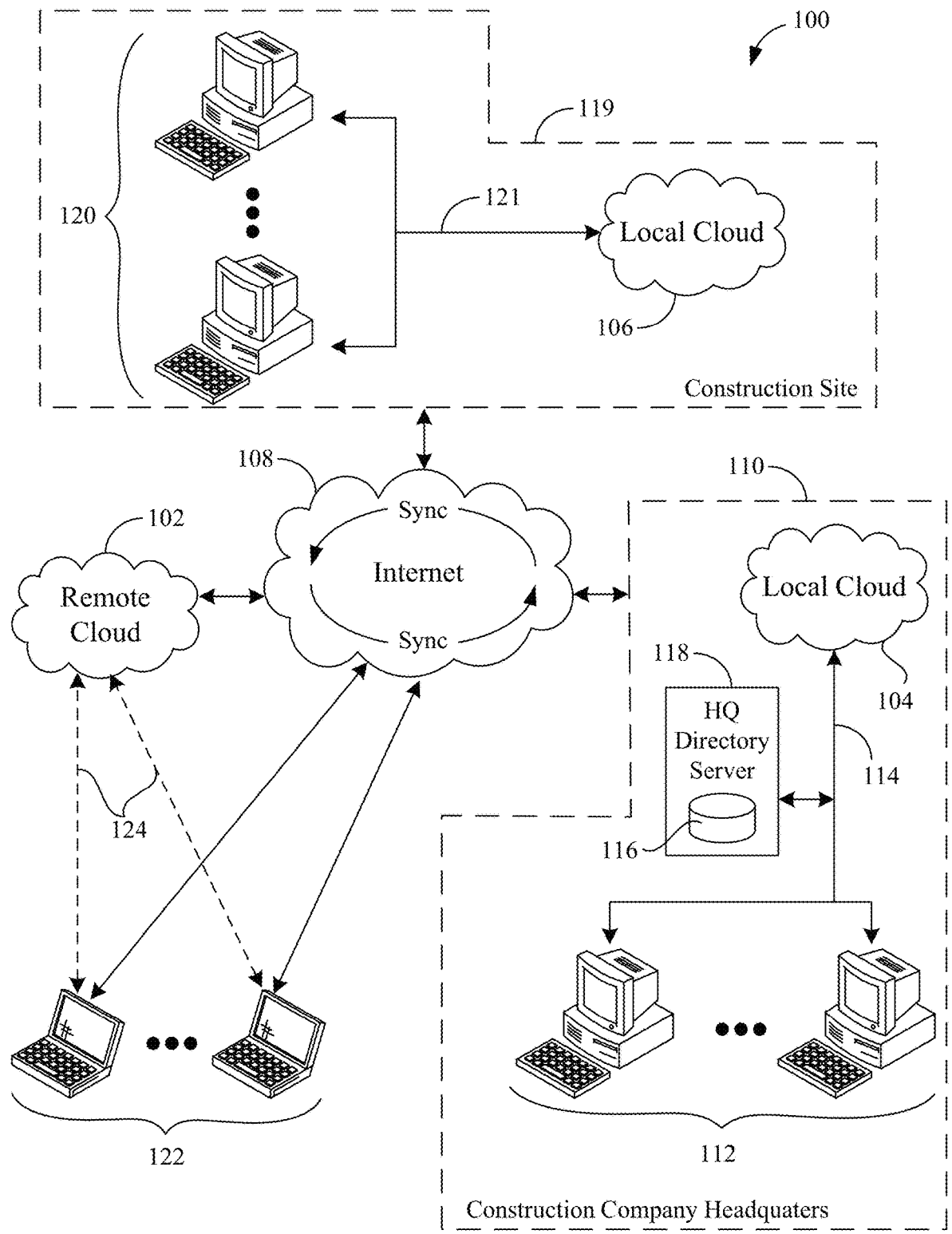
FIG. 1 shows an exemplary cloud storage system according to the invention.

FIG. 1 shows a cloud computing system 100 that includes a remote cloud server 102, a local cloud server 104, and a local cloud server 106, which communicate and are synchronized via the Internet 108. Local cloud server 104 can be hosted, for example, by a file server at the headquarters (HQ) 110 of a construction company. A local file system (e.g., namespace and file data) stored on local cloud server 104 is synchronized with remote cloud server 102 to provide local and remote data access and remote data security. In this embodiment, at least a portion of the local file system stored on local cloud server 104 is bi-directionally synchronized with remote cloud server 102. Although one-way synchronization of all or portions of the local and remote file systems is also possible. Local users of the construction company can access local file system objects stored on local cloud server 104 via local clients 112, which are devices in communication with local cloud server 104 via a local network 114. Optionally, local cloud server 104 can extend access for local clients 112 to the customer's remote file system stored on remote cloud server 102 via Internet 108.

The construction company also maintains a HQ user directory 116 and an HQ directory server 118 at headquarters 110, which are also coupled to local network 114. HQ user directory 116 includes user definitions for a plurality of users that have access to the local file system stored on local cloud 104 and/or one of the construction company's other local file system(s) stored on other ones of their local cloud servers, for example, local cloud server 106. HQ directory server 118 manages the users stored in directory 116 and implements, for example, Microsoft's Active Directory directory service.

Local cloud server 106 is located at a construction site 119 that is remote to both the headquarters 110 and remote cloud 102. Local cloud server 106 also provides local file system access to its own local clients 120 at construction site 119, where its local file system is also synchronized with remote cloud server 102. Thus, in the example shown in FIG. 1, the construction company has two local file systems stored on respective local clouds 104 and 106. However, it will be understood that the construction company can have any number of local file systems stored across any number of local cloud devices (e.g., across many different job sites).

Remote cloud server 102 maintains a remote (cloud) file system associated with construction company. The remote file system includes portions that are synchronized with the local file system stored on local cloud 104 and the local file system stored on local cloud 106 as well as an optional cloud-only file system. Remote users of the construction company can access its remote file system via remote client devices 122 over Internet 108 or via some other connection 124 with remote cloud server 102.

As will be described in more detail below, remote cloud 102 advantageously provides centralized control and synchronization of cloud parameters (e.g., user definitions, etc.) used to define and control the operation of cloud storage system 100. More specifically, remote cloud server 102 provides centralized management and control of user accounts having local access to the local file systems on local cloud server 104 and local cloud server 106.

It should also be noted that the construction company associated with local clouds 104 and 106 will be described herein as a "subscriber" or a "customer" of a cloud service provider operating remote cloud server 102. Accordingly, it will be understood that remote cloud server 102 can store and synchronize file systems associated with many other customers as well, for example, on a subscription basis. Additionally, the terms "subscriber" and "customer" should be thought of expansively to include any entity that uses the cloud services described herein, whether or not something of value (e.g., money) is exchanged for those cloud services.

Figure 2:
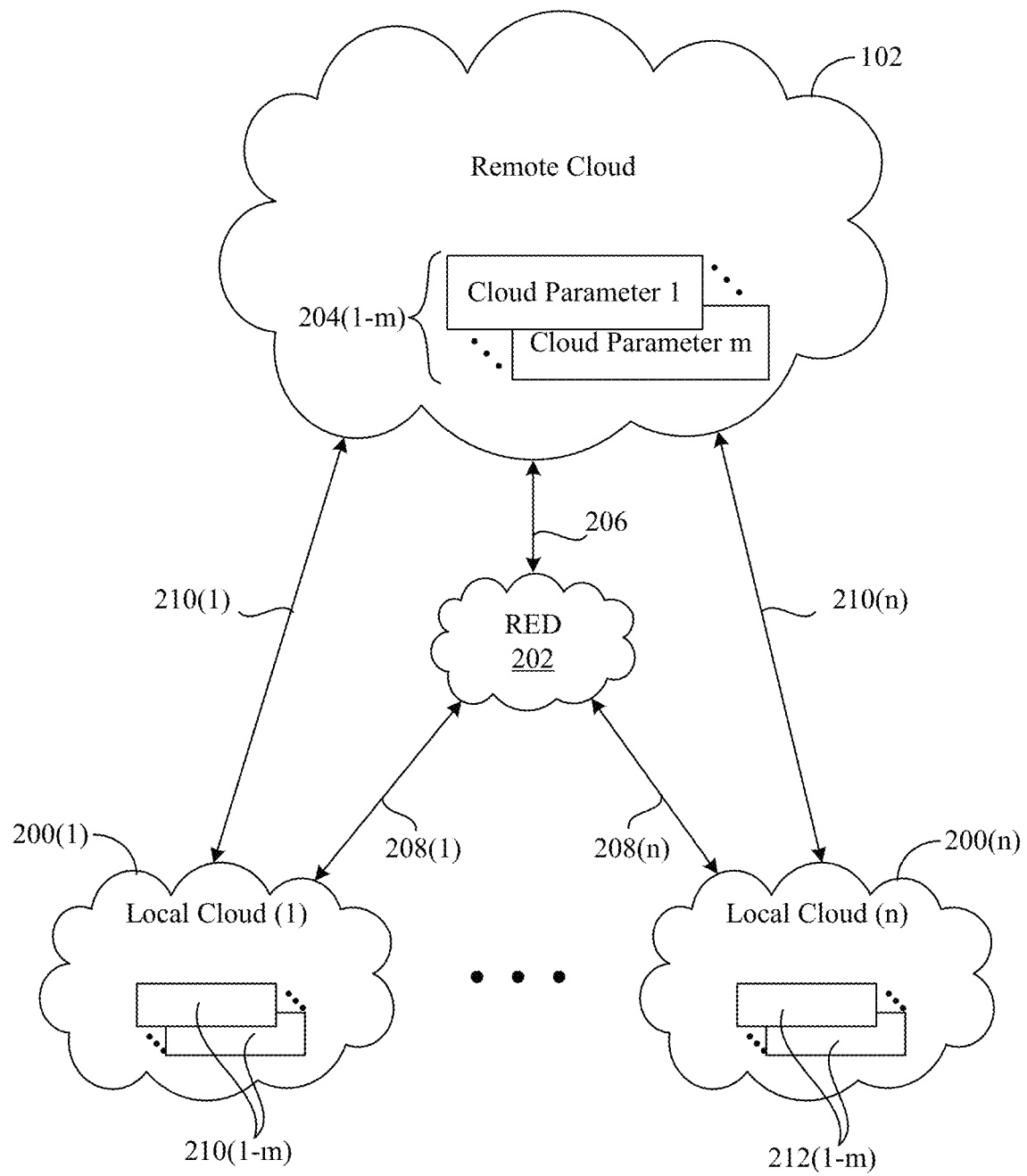
FIG. 2 is a diagram showing the remote cloud of FIG. 1 utilizing a real-time event delivery (RED) service to synchronize cloud parameters with local cloud(s) according to the invention.

FIG. 2 shows a high-level overview of various beneficial aspects of the present invention. More specifically, FIG. 2 shows remote cloud server 102 and a plurality of local cloud servers 200(1-n) (e.g., local cloud servers 104 and 106 for the example of FIG. 1) interconnected via a real-time event delivery (RED) server 202. Remote cloud server 102 maintains cloud parameters 204(1-m), which coordinate and control various functions of the cloud storage system. In the case of FIG. 1 and subsequent figures, the cloud parameters 204(1-m) comprise user definitions of the hybrid cloud system 100. However, the centralized control features of the present invention could be used for other cloud parameters 204 (e.g., file storage parameters, etc.).

FIG. 2 also shows that cloud parameters 204(1-m) (or some subset thereof) are provided from remote cloud 102 to each local cloud server 200(1-n) via RED server 202 and persistent connections 206 and 208(1-n), respectively. More specifically, RED server 202 facilitates Web Socket connection(s) 206 between remote cloud server 102 and RED server 202 and respective Web Socket connections 208(1-n) between RED server 202 and local cloud servers 200(1-n). Web Socket connections 206 and 208(1-n) are persistent TCP connections established using known WebSocket protocols and APIs (e.g., RFC 6455, WebSocket API, etc.). WebSocket connections 206 and 208(1-n) can advantageously provide full duplex communication between remote cloud 102 and local clouds 200(1-n), behind-firewall access on local clouds 200(1-n), and near-real time software and/or parameter updates between remote cloud server 102 and local cloud servers 200(1-n). Accordingly, if a cloud parameter 204 is changed on remote cloud 102 (e.g., by an administrator of a customer, etc.), an event indicative of the altered parameter can be quickly communicated to any of affected local cloud servers 200(1-m) and applied there. In this way, cloud parameters 204(1-m) can be continually synchronized between remote cloud server 102 and local cloud servers 200(1-n) in near real time. This also enables remote cloud server 102 to have global control of the states of such parameters 204.

In the example embodiment, RED server 202 is shown located remotely from remote cloud server 102. In alternative embodiments, RED server 202 can be hosted on premises alongside remote cloud server 102 via a private network, hosted by a third party service, etc. Additionally, RED server 202 can be a single server or can be a plurality of servers each hosting different ones of connections 206 and 208(1-n). As still another option, RED server 202 can be omitted with cloud parameters 204(1-m) and changes thereto being communicated by alternative connections 210(1-n) (e.g. using HTTP, RESTful APIs, etc.) between remote cloud server 102 and local cloud servers 200(1-n). Connections 210(1-n) are useful where, for example, the particular parameters 204 and/or the associated operations are incompatible with Web Socket communications or Web Socket communications are undesirable.

Figure 3A:
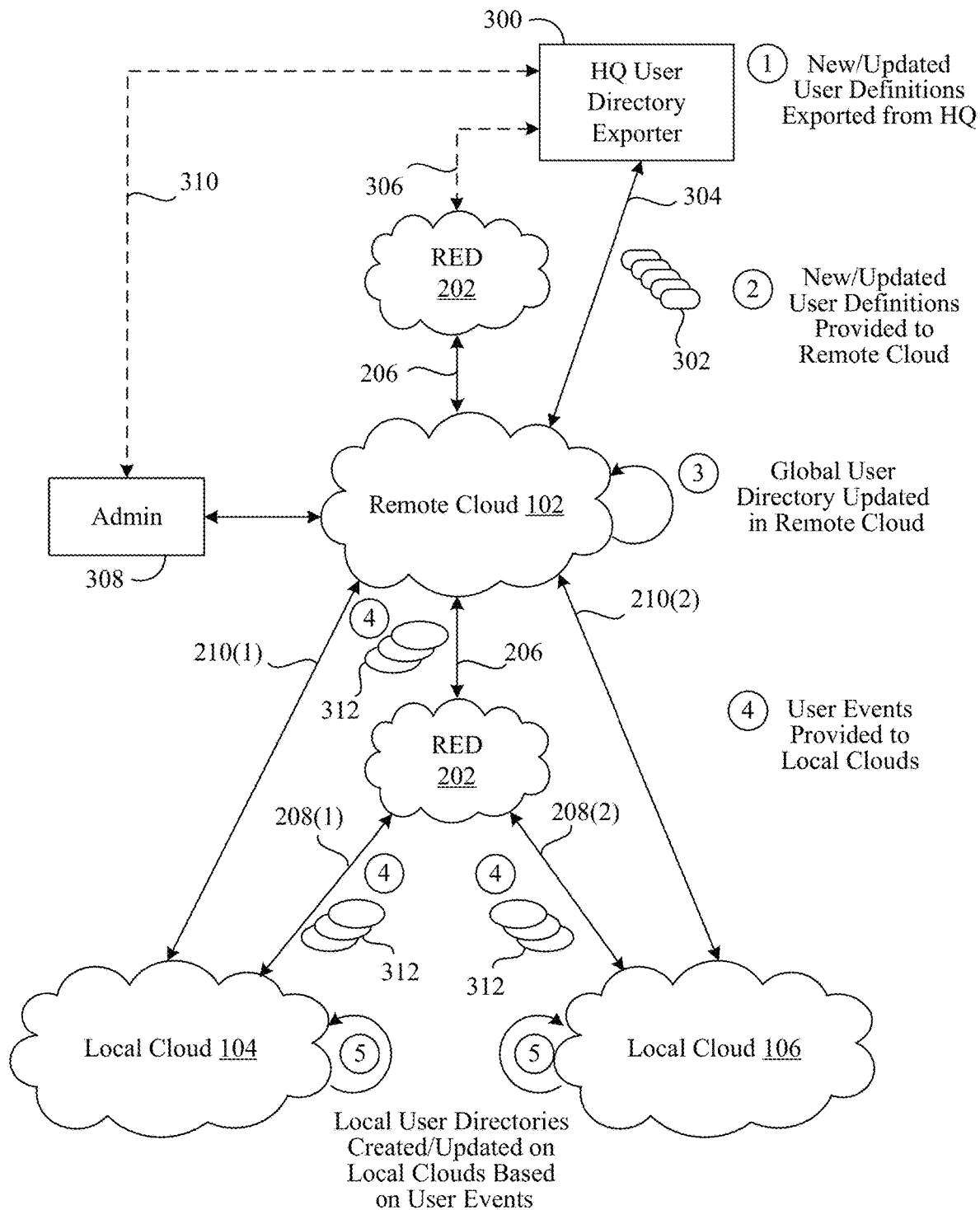
FIG. 3A is a diagram illustrating event-based user state synchronization for the cloud computing system of FIG. 1 and utilizing the RED service of FIG. 2.

FIG. 3A is a diagram showing the process for synchronizing user definitions throughout cloud computing system 100 when the customer has an HQ active directory service 118. In the case of FIG. 3A, cloud computing system 100 includes remote cloud server 102, local cloud server 104 (at the HQ) and local cloud server 106 at a construction site (non-HQ), However, system 100 can include additional local cloud servers associated with the construction company.

In this embodiment, remote cloud server 102, local cloud server 104, and local cloud server 106 are all interconnected via one or more RED server(s) 202. An HQ user directory exporter 300 has been deployed and installed at the HQ 110 (FIG. 1) and has access to user definitions stored in HQ user directory 116. At (1), exporter 300 scans HQ user directory 116 for HQ user definitions (e.g., users, groups, user-group mappings, etc.), optionally maps the HQ user definitions to an alternative format, and generates user definitions 302 recognizable by remote cloud server 102. More specifically, when a user state synchronization is requested (e.g., by an administrator), HQ user directory exporter 300 requests a snapshot of the user definitions stored on a global user directory (FIG. 6) from remote cloud server 102 and retrieves a snapshot of the user state stored on HQ user directory 116 via HQ directory server 118. (During an initial synchronization, there may not be any global user definitions to return from remote cloud server 102.) Upon receiving the global user state snapshot from remote cloud server 102, HQ user directory exporter 300 compares the snapshots of the local and remote user states and determines user definitions and/or updates that need to be applied on remote cloud server 102 to synchronize its global user directory and HQ user directory 116.

It should be noted that the term "user definitions" should be interpreted expansively to include any definitions associated with defining or establishing user accounts for cloud storage system 100. Therefore, "user definitions" can include definitions of the actual user accounts themselves, as well as, other definitions related to those user accounts, such as groups, user-group mappings, etc.

At (2), the generated user definitions and/or updates 302 are provided to remote cloud server 102 via a connection 304 established over the Internet (e.g., via REST APIs). Alternatively, user definitions 302 can be provided to remote cloud server 102 via a RED server 202 and an associated WebSocket connection 306. HQ user directory exporter 300 provides HQ user definitions for the initial synchronization and can thereafter be configured to provide user definitions 302 at some predetermined interval (e.g., every 10 minutes, every day, etc.) or at the request of an administrator 308 associated with the construction company. Administrator 308 can communicate with exporter 300 via remote cloud 102 and connection 304, or alternatively, via a dedicated connection 310 (e.g., via local network 114, etc.).

At (3), cloud user definitions stored in the global user directory on remote cloud server 102 are updated based on the received user definitions 302. More specifically, remote cloud server 102 compares the received user definitions 302 to the cloud user definitions that are already present in the global user directory and makes changes to the global user directory to synchronize it with the provided user definitions 302.

Administrator 308 also accesses the global user directory stored on remote cloud 102 and selects which of the user accounts defined there should have access to local clouds 104 and 106 on a local-cloud-by-local-cloud basis. Administrator 308 can perform these functions, for example, using a graphical user interface provided by remote cloud server 102. For example, administrator might determine that a first and second user should be permitted local access on local cloud server 104, whereas the first, a third, and a fourth user should have local access on local cloud 106. These user-to-local-cloud mappings are stored in the global user directory as described later.

At (4), remote cloud server 102 generates user events 312 responsive to changes implemented in the global user directory based on the user definitions 302. User events 312 comprise data messages that communicate changes in the global user definitions that affect user accounts assigned (mapped) to local cloud servers 104 and 106. User events 312 contain information enabling each of local cloud servers 104 and 106 to synchronize their respective local user definitions with the global user definitions stored on remote cloud 102. User events 312 are sent in near real-time to each of local cloud servers 104 and 106 via RED server 202 and connections 208(1-2), respectively.

At (5), local user directories (FIG. 12) are created or updated on each of local cloud servers 104 and 106 based on the user events 312. Local cloud servers 104 and 106 can then authenticate local users for local access to their respective local file systems in accordance with the synchronized local user definitions.

In one embodiment, all user events 312 are sent to each of local cloud server 104 and 106 (e.g., those associated with a particular domain (workgroup)), whereby each local cloud server 104 and 106 acts on the user events 312 that are relevant to a local user mapped to it and ignores the rest. Alternatively, remote cloud server 102 can send only relevant user events 308 to each of local cloud servers 104 and 106 on a device-by-device basis. For example, a user event 312 associated with a user having local access to only local cloud server 104 (e.g., the second user discussed above) would be sent only to local cloud 104.

Figure 3B:
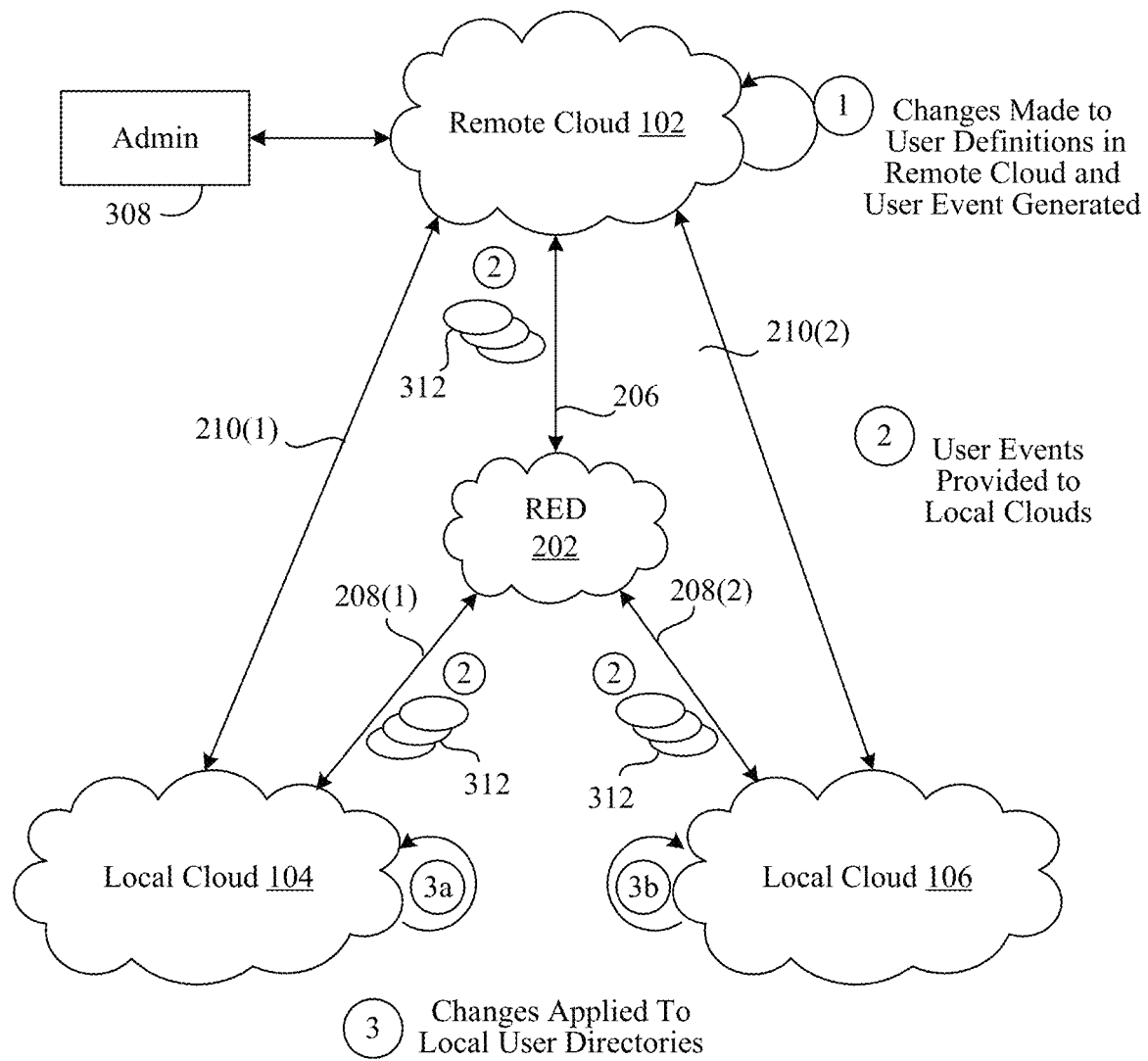
FIG. 3B is a diagram showing continued event-based user state synchronization on the cloud computing system of FIG. 1.

FIG. 3B is a diagram showing continued user state synchronization of cloud computing system 100. At (1), changes are made to the states of global user definitions in the global user directory of remote cloud server 102 by administrator 308 associated with the construction company. These changes trigger the generation of user events 312 by remote cloud server 102 for any user accounts that have been mapped to local cloud 104 and/or local cloud 106. At (2), the generated user events 312 are provided from remote cloud 102 in near real-time to local cloud server 104 and local cloud server 106 via RED server 202 and connections 206 and 208(1-2), respectively. At (3a), changes are implemented to the local directory of local cloud server 104 based on the received events in order to synchronize the local user definitions there with the updated global user definitions in the global user directory on remote cloud server 102. At (3b), changes are also implemented to the local user directory of local cloud server 106 to synchronize the relevant local user definitions there with the corresponding global user definitions on remote cloud server 102.

FIGS. 3A and 3B illustrate various advantages provided by the present invention. First, remote cloud server 102 is able to import user definitions from the customer's active directory server 118 as global user definitions. Remote cloud server 102 can then push relevant global user definitions for authorized users, and any subsequent changes thereto, to the corresponding local cloud servers 104 and 106, where they will be enforced as local user definitions by the respective local cloud servers. Therefore, remote cloud server 102 provides centralized coordination and control of global and local user accounts and is the authoritative user event source for local cloud servers 104 and 106. This further enables the mapped local users to log into local cloud servers 104 and 106 and access their respective local file systems without the local cloud servers 104 and 106 having to establish a separate connection with another directory service (e.g., HQ directory server 118, remote cloud server 102, etc.) to verify that a local user is authorized. Accordingly, local cloud servers 104 and 106 can still provide local user authentication and file system access even when operating in off-line mode (e.g., disconnected from Internet 108). Additionally, because RED server 202 maintains Web Socket connections 206 between remote cloud server 102 and local cloud servers 104 and 106 when online, user events (and associated messages) are communicated between cloud elements in near-real time. Therefore, the local user directories on local cloud servers 104 and 106 are synchronized in near real-time with the global user directory on remote cloud server 102. This minimizes the chances of unauthorized local access occurring following a change (e.g., deactivation of a user account, etc.) to cloud user definitions.

Figure 4:
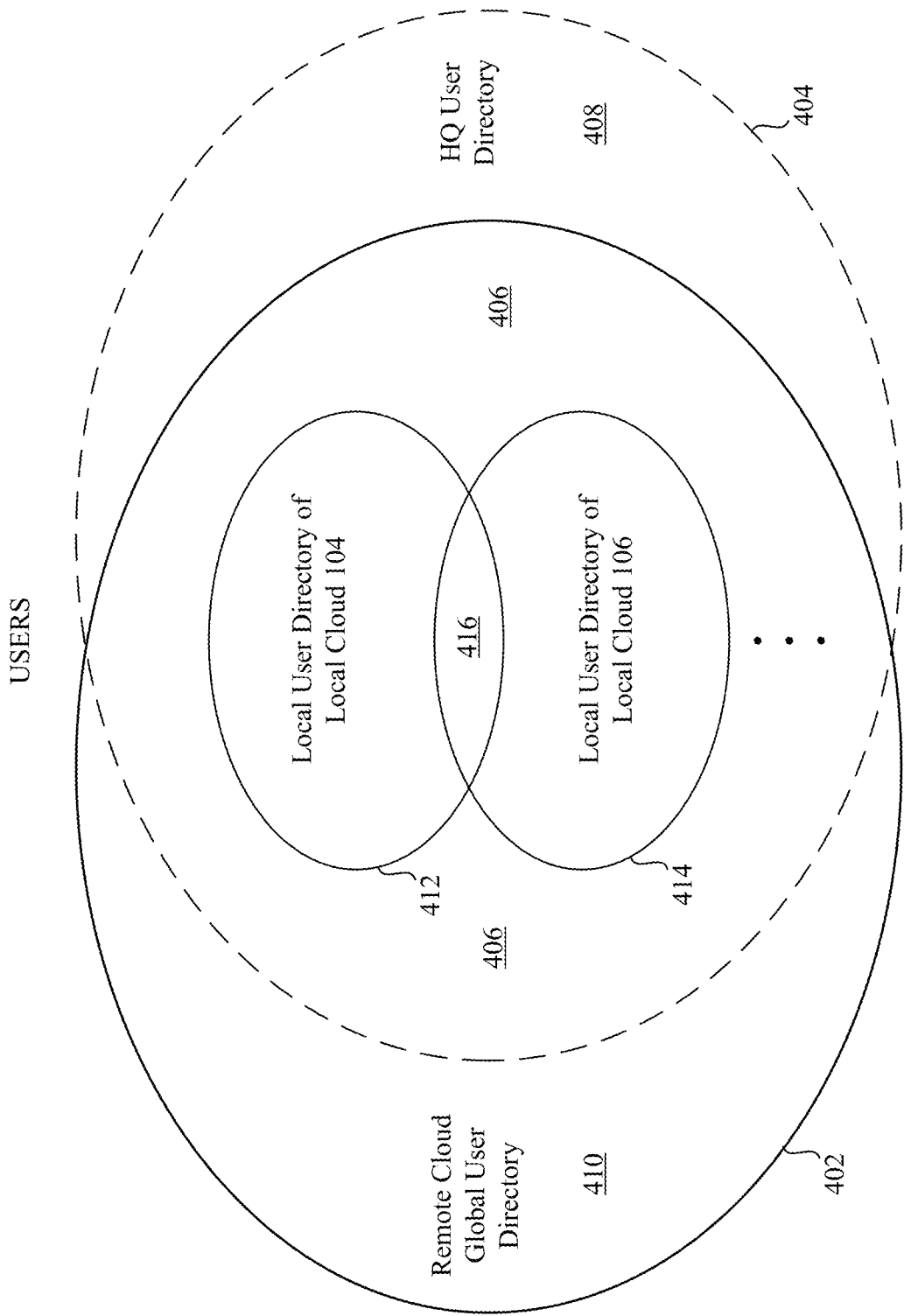
FIG. 4 is a Venn diagram showing relationships between the user directories stored on the remote cloud server and local cloud servers of FIG. 1.

FIG. 4 is a user space Venn diagram showing the relationships between user accounts on remote cloud server 102, local cloud servers 104 and 106, and HQ user directory 116. A first ellipse 402 illustrates the users defined by global user definitions in the global user directory on remote cloud server 102. A second ellipse 404 illustrates the users defined by HQ user definitions contained in HQ user directory 116. The area 406 where ellipses 402 and 404 overlap illustrates the user accounts defined in both the global user directory on remote cloud server 102 and in HQ user directory 116 at the customer's headquarters. In other words, the area 406 represents the HQ users that have been mapped for remote and/or local access to cloud storage system 100. The area 408 of ellipse 404 is associated with HQ users (e.g., "private users") that do not have associated user accounts on remote cloud system 100, whereas the area 410 of ellipse 402 represents users associated with the construction company (e.g., "remote-cloud-only users", independent contractors, etc.) that have only cloud access to the remote file system on remote cloud server 102, but that are not part of HQ user directory 116.

Ellipse 412 represents the users that have access to at least some of the local file system on local cloud server 104. Accordingly, user definitions will exist for the users of area 412 in the local user directory of local cloud 104, the global user directory of remote cloud server 102, and in the HQ user directory 116 of the HQ active directory service 118. Similarly, Ellipse 414 represents the users that have access to at least some of the local file system on local cloud server 106. Accordingly, user definitions will also exist for the users of area 414 in the local user directory of local cloud 106, the global user directory of remote cloud server 102, and in the HQ user directory 116 of the HQ active directory service 118. The users of area 416 correspond to users that have local access to each of local cloud servers 104 and 106, such as an employee who might travel between construction sites (e.g., site 119) and the headquarters 110. Although not shown in FIG. 4, is should be noted that ellipses 412 and/or 414 can optionally include users from area 410. Users that have local (e.g. on-premises) access to a local file system hosted by one of local cloud servers 104 and 106 are sometimes referred to as "power users", whereas "standard" or "limited" users only have access to the remote file system on remote cloud server 102.

Figure 5:
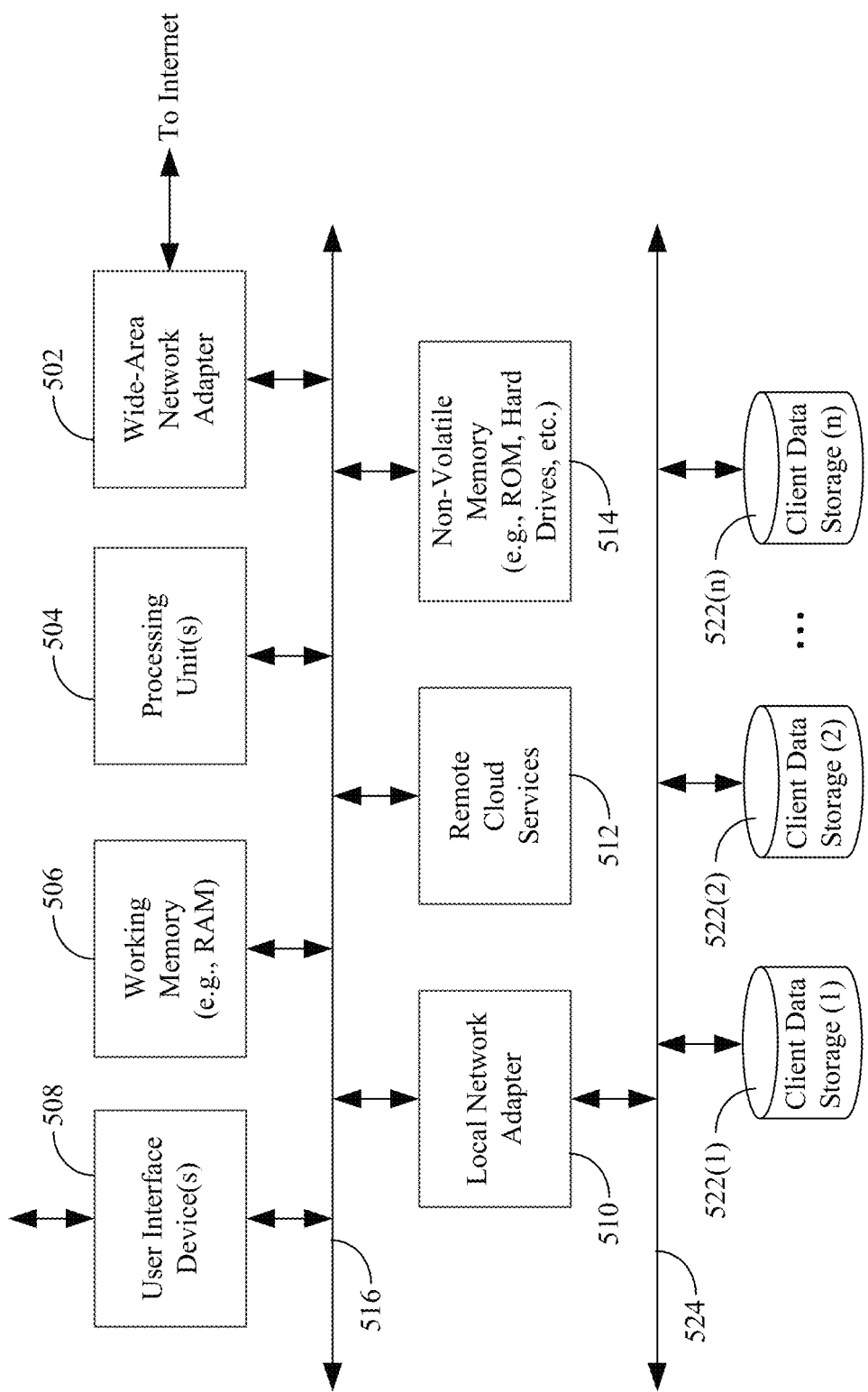
FIG. 5 is a block diagram of the remote cloud server of FIG. 1.

FIG. 5 is a block diagram showing remote cloud server 102 in greater detail. Remote cloud server 102 includes a wide-area network adapter 502, one or more processing units 504, working memory 506, one or more user interface devices 508, a local network adapter 510, a remote cloud services 512, and non-volatile memory 514, all intercommunicating via an internal bus 516. Processing units(s) 504 impart functionality to remote cloud server 102 by executing code stored in any of non-volatile memory 514, working memory 506, and remote cloud services 512. Remote cloud services 512 represents hardware, software, firmware, or some combination thereof, that provides the user state synchronization functionality described herein.

Wide area network adapter 502 provides a means for remote cloud server 102 to communicate with remote clients 122, local cloud server 104, local cloud server 106, and (optionally) RED server 202 via Internet 108. Local network adapter 510 provides a means for accessing a plurality of data storage devices 522(1-n), and optionally RED server 202, via a private network 524. Customers' files are stored in and retrieved from data storage devices 522(1-n) as needed. Additional data storage devices 522(n+) can be added as needed to provide additional storage capacity. In this example embodiment, data storage devices 522(1-n) are network attached storage (NAS) devices, but any suitable type of storage device can be used.

Cloud-based object-storage infrastructures are further described in U.S. Pat. No. 9,135,269, issued on Sep. 15, 2015 to Shetty et al. and entitled "System And Method Of Implementing An Object Storage Infrastructure For Cloud-Based Services", which is incorporated herein by reference in its entirety.

Figure 6:
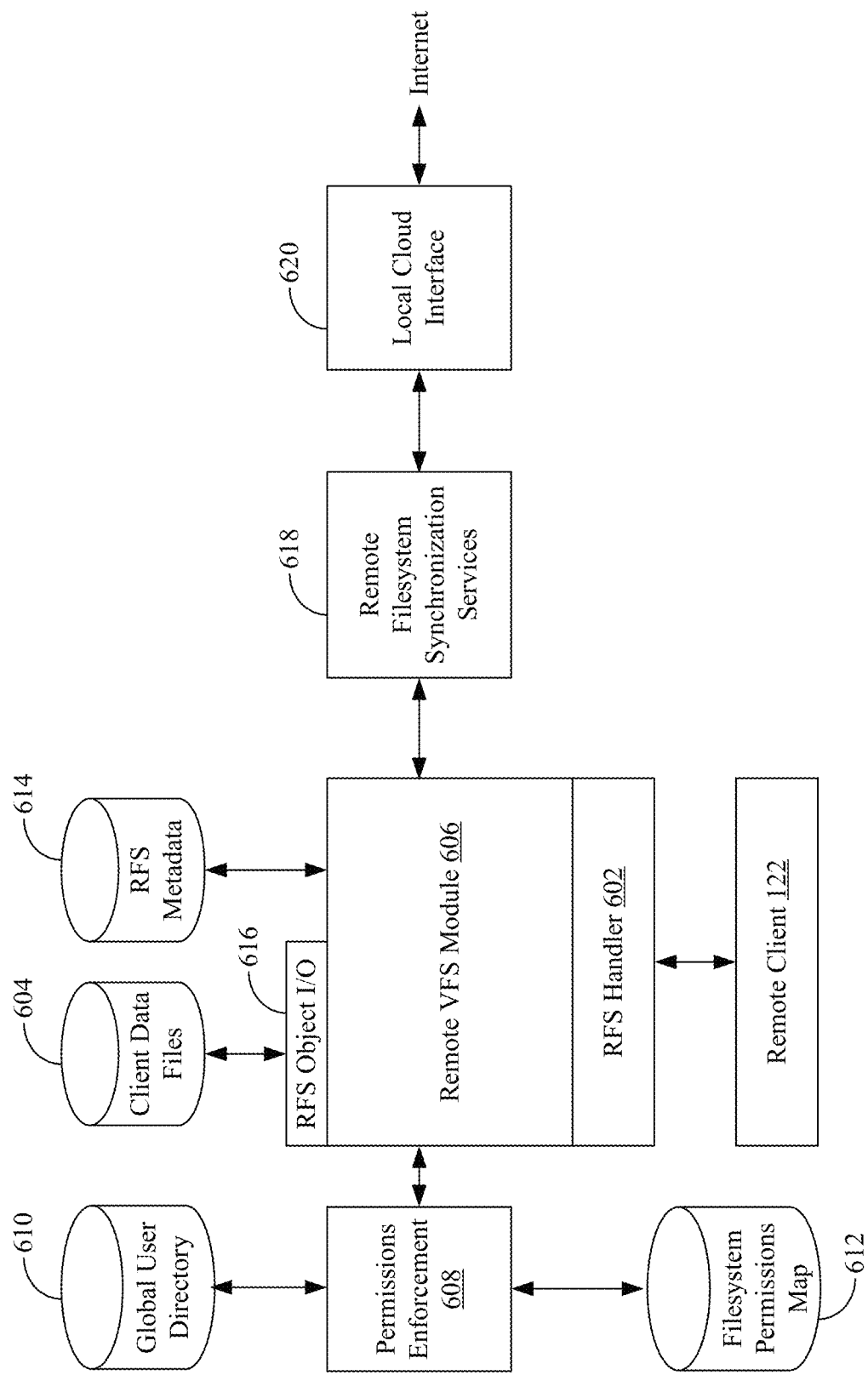
FIG. 6 is a relational diagram showing functional aspects related to remote file system access on the remote cloud server of FIG. 1.

FIG. 6 is a relational diagram showing the functional aspects of remote cloud server 102 related to remote file system access in greater detail. These functional aspects are provided by remote cloud services 512 in this embodiment but could be distributed across other service modules or even other machines.

Remote client 122 is a device and/or process enabling a remote user to access the remote file system via the Internet 108 or via connection 124 (FIG. 1). RFS handler 602 represents an interface/protocol (e.g., HTTP, WebUI, Web-DAV, REST APIs, etc.) by which remote client 122 can access and modify a remote file system defined by the data stored in RFS metadata 614 and client data storage devices 522(1-n). For example, RFS handler 602 can implement, an interface compatible with a mobile application running on a tablet or smartphone, etc. Responsive to remote client 122, RFS handler 602 calls a remote virtual file system (VFS) module 606.

Remote VFS module 606 intercepts the file system access request from remote client 122 via RFS handler 602 and calls permissions enforcement module 608. Permissions enforcement module 608 authenticates remote client 122 against a global user directory 610, which contains user definitions for users with access to at least a portion of the remote file system stored on remote cloud server 102 (the users shown in ellipse 402 of FIG. 4). Permissions enforcement module 608 also enforces cloud permissions on the remote file system directory by utilizing a filesystem permissions map 612. Filesystem permissions (e.g., file and folder permissions) and enforcement are discussed only generally herein so as not to obscure the invention. However, permission management frameworks for cloud file systems are described in detail in U.S. Pat. No. 9,483,491, issued Nov. 1, 2016 to Wijayaratne et al. and entitled "Flexible Permission Management Framework For Cloud Attached File Systems", which is incorporated herein by reference in its entirety.

If the user on remote client 122 is authorized, then remote VFS module 606 provides remote client 122 with file and folder access to client data files 604 (e.g., via a directory tree view of the folders and files). The remote client 122 can then interact with the virtual file system and make changes to file system objects. When a data file 604 needs to be uploaded to, downloaded from, or deleted from client data storage devices 522(1-n), remote VFS module 606 utilizes a RFS object I/O module 616 to facilitate the data file transfer to or from client data storage 522(1-n). RFS object I/O module 616 manages the I/O subsystem for organized data file storage and retrieval on data storage devices 522(1-n).

A remote filesystem synchronization services module 618 synchronizes the portions of client data files 604 and RFS metadata 614 associated with a synchronized namespace between remote cloud server 102 and an associated local cloud server via a local cloud interface 620. Local cloud interface 620 establishes and maintains a connection to Internet 108 and facilitates synchronization communications between remote cloud server 102 and local cloud servers 104 and 106. Remote filesystem synchronization services module 618 is shown only generally to represent possible synchronization services available to remote cloud server 102. Some synchronization systems and methods are described in the following publications and applications, each of which is incorporated by reference herein in its entirety:

U.S. Publication No. 2014/0040196, published Feb. 6, 2014 by Wijayaratne et al. and entitled "System And Method For Event-Based Synchronization Of Remote And Local File Systems";

U.S. Publication No. 2014/0040197, published Feb. 6, 2014 by Wijayaratne et al. and entitled "System And Method For Event-Based Synchronization Of Remote And Local File Systems";

U.S. Pat. No. 9,424,437 B1, issued Aug. 23, 2016 to Ancin et al. and entitled "Systems and Methods for Providing File Access in a Hybrid Cloud Storage System";

U.S. Publication No. 2016/0019233, published Jan. 21, 2016 by Wijayaratne et al. and entitled "System And Method For Policy Based Synchronization Of Remote And Local File Systems"; and U.S. patent application Ser. No. 15/179,459 filed Jun. 10, 2016 by Sharma et al. and entitled "System And Method For Synchronizing File Systems With Large Namespaces".

Figure 7:
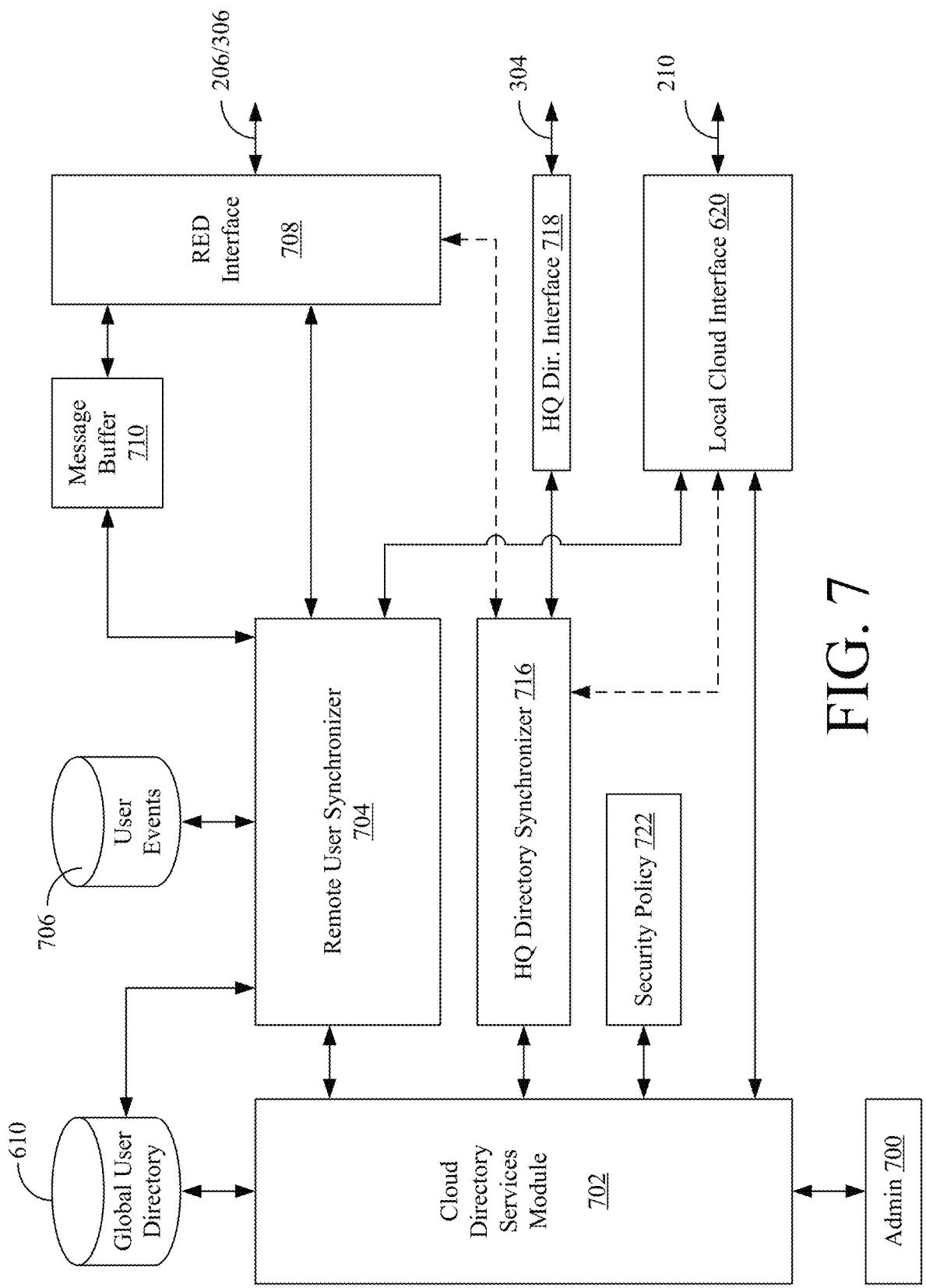
FIG. 7 is a relational diagram showing functional aspects related to user state synchronization on the remote cloud server of FIG. 1.

FIG. 7 is a relational diagram showing functional aspects related to user state synchronization of remote cloud server 102 in greater detail. In the illustrated embodiment, the functional aspects are provided by remote cloud services 512 but could be distributed across other service modules or even other machines.

Administrator 700 (e.g., a remote client 122 with an administrative role) is a device and/or process used to access remote cloud server 102 and make changes to the states of the global user definitions stored in global user directory 610. On login, administrator 700 establishes a connection with a cloud directory services module 702 (e.g., via the Internet 108, connection 124, etc.). RFS directory service module 702 represents an interface/protocol by which administrator 700 can access and modify global user definitions stored in global user directory 610. Cloud directory services module 702 authenticates administrator 700 against global user directory 610 to ensure administrator 700 is authorized to access and/or make changes to the global user definitions stored therein.

In addition to global user directory 610, cloud directory services module 702 communicates with various other functional elements of FIG. 7, including a remote user synchronizer 704. When administrator 700 makes a change to the existing state of a global user definition stored in global user directory 610, cloud directory services module 702 reports the change to remote user synchronizer 704. In response to the reported change, remote user synchronizer 704 creates one or more user event records in a user events database 706. Responsive to an event record being created in user events database 706, remote user synchronizer 704 generates a user event message in a format compliant with the WebSocket protocol, for example, by packaging the message as a payload and appending a header to it. As part of this process, remote user synchronizer 704 optionally queries RED server 202 via a RED interface 708 and Web Socket connection 206, for example, to obtain destination information for the message (e.g., information regarding local cloud servers that are also connected to RED server 202, etc.). Such destination information can also form part of the user event package. Thereafter, RED interface 708, which establishes and maintains a WebSocket connection 206 with RED server 202 on behalf of remote cloud server 102, reads the event messages (e.g., in a first-in-first-out manner, etc.) from message buffer 710, and provides the message to RED server 202 via Web Socket connection 206. Once an event message is communicated to RED server 202, the message can be removed from buffer 710.

Figure 12:
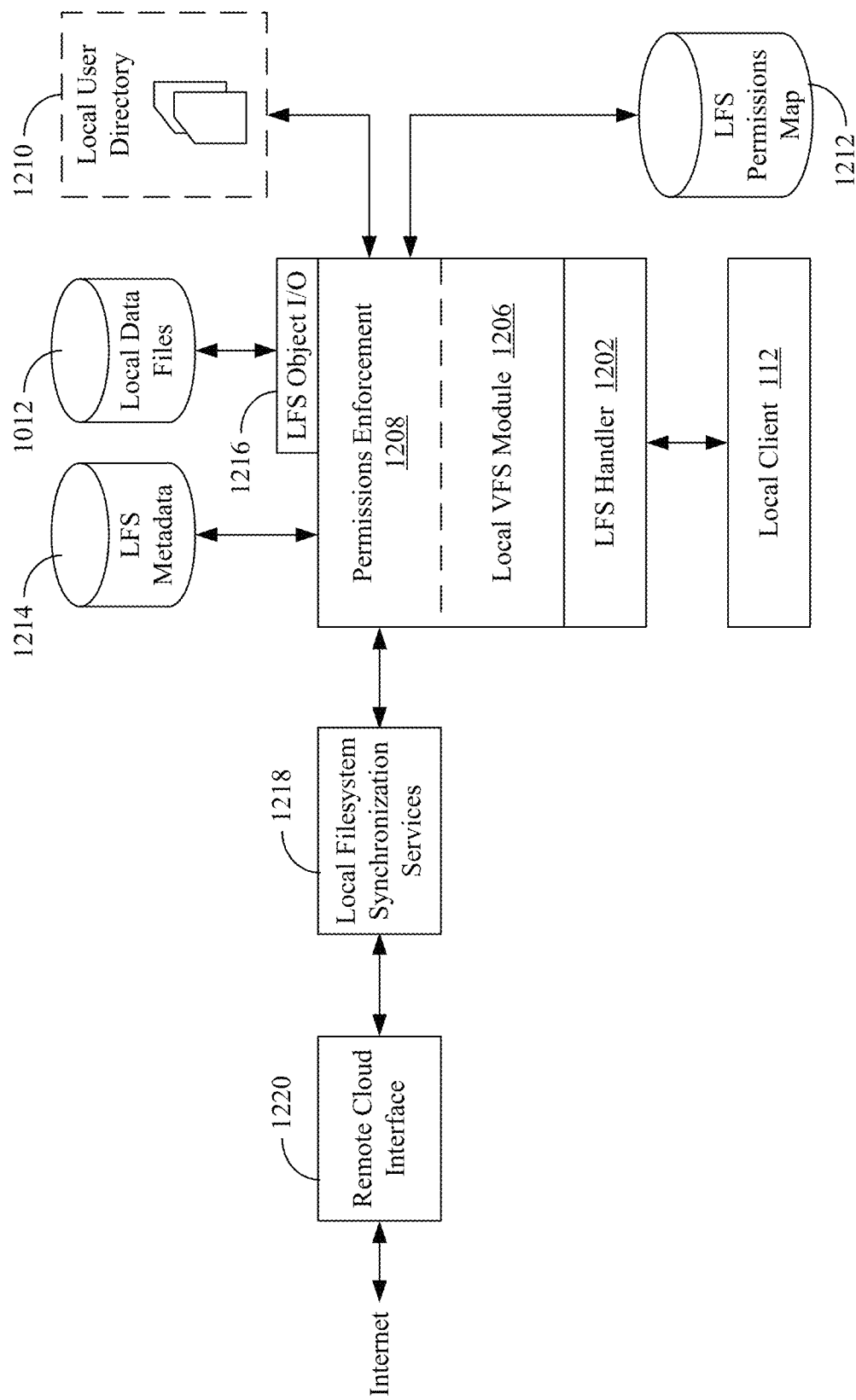
FIG. 12 is a relational diagram showing functional aspects related to local file system access on the local cloud servers of FIGS. 10A and 10B.

Each outgoing user event message contains data that communicates a change in a global user definition associated with a power user to the associated local cloud server. Accordingly, the receiving local cloud server 104 or 106 will know what changes should be made to its local user directory to synchronize the state of its local user definition with the related global user definition. In the present embodiment, outgoing user event messages comprise JSON objects but other types of payloads are possible. When local cloud servers 104 and 106 receive the user event messages, they will apply the user state changes to their associated local user definitions in their respective local user directories (FIG. 12).

In addition to event-based user synchronization, remote user synchronizer 704 also communicates with local cloud servers 104 and 106 via local cloud interface and connections 210 to facilitate rescan-type (e.g., snapshot-based) synchronizations. More specifically, remote user synchronizer 704 occasionally receives a user synchronization request from a local cloud server via local cloud interface 620. Responsive to this request, remote user synchronizer 704 obtains a snapshot of all or a portion of the global user definitions in global user directory 610 that have been mapped to the local cloud server making the request. Synchronizer 704 then delivers the snapshot to the requesting local cloud server via local cloud interface 620. This type of synchronization can be employed, for example, using REST APIs. A local cloud server can request this type of synchronization at different times, for example, when it is returning to an online state from an offline state, when a local user initially logs on to the local cloud server, etc.

In some embodiments, remote user synchronizer 704 can process catch-up requests from a local cloud server via RED interface 708. In such a case, remote user synchronizer 704 can receive a message from the local cloud server requesting all applicable events (e.g., pertaining to users assigned to a particular workgroup, to a particular locally-mapped user, etc.) that were created after a particular time (e.g., since the last snapshot-based synchronization, since the local user last logged in locally, etc.). Responsive to this request, remote user synchronizer 704 queries events database 706 for event records occurring after the identified time, generates event messages for the identified event records, and then provides those messages to the requesting local cloud server via RED interface 708 and RED server 202.

An HQ directory synchronizer 716 also facilitates rescan-type (e.g., snapshot-based) synchronizations between remote cloud server 102 and HQ directory server 118. In particular, when a synchronization is initiated, HQ directory synchronizer 716 obtains a snapshot of the current global user definitions (e.g., the users, groups, and user-group mappings) from global user directory 610 and provides the snapshot to HQ user directory exporter 300 via an HQ directory interface 718 and connection 304. Optionally, HQ directory synchronizer 716 can communicate with HQ directory exporter 300 via RED interface 708, in the case that exporter 300 uses Web Socket communications, or alternatively via local cloud interface 620 in the case that HQ directory exporter 300 is installed as a service on a local cloud server. HQ directory synchronizer 716 can begin a synchronization process responsive to a request from HQ user directory exporter 300, responsive to cloud directory services module 702, responsive to a request from administrator 700, responsive to a predetermined time interval, etc.

Thereafter, HQ directory exporter 300 will compare the provided snapshot with the current state of the associated portions of the HQ user directory 116, and then export new and/or updated HQ user definitions (e.g., users, groups, user-group mappings, etc.) back to remote cloud server 102. HQ directory synchronizer 716 receives these new and/or updated definitions and communicates them to cloud directory services module 702, which applies the changes to the corresponding user definitions (e.g., the users, groups, and user-group mappings) stored in global user directory 610. In the case of an initial user synchronization (e.g., following the initial setup for a customer), HQ directory synchronizer 716 can receives a complete set of user definitions from HQ directory exporter 300, so that cloud directory services module 702 can instantiate associated global user definitions in global user directory 610 for the first time. Any changes made to global user directory 610 during this process, in turn, cause user events to be created and pushed to the associated local cloud servers 104 and/or 106 by remote user synchronizer 704 as described above.

Cloud directory services module 702 is also operative to update global user definitions stored in global user directory 610 responsive to a security policy 722, optionally defined in whole or in part by administrator 700. Security policy 722 implements various security parameters that improve the security of cloud storage system 100. For example, security policy 722 can cause cloud directory services module 702 to reset user passwords in global user directory 610 every certain number of days (e.g., every 60 days), to lock a user account after a certain number of failed login attempts, etc. The resulting changes in global user directory 610 in turn cause remote user synchronizer 704 to create user events and push them to the associated local cloud servers 104 and/or 106 as discussed above.

Local cloud interface 620 provides a connection 210 between remote cloud server 102 and a local cloud server via internet 108 for various uses. Local cloud interface 620 can also facilitate other features. For example, in some embodiments, local cloud interface 620 can forward access for a power user (e.g., in an administrative role, etc.) to remote cloud server 102 from local cloud server 104 and/or 106.

Figure 8A:
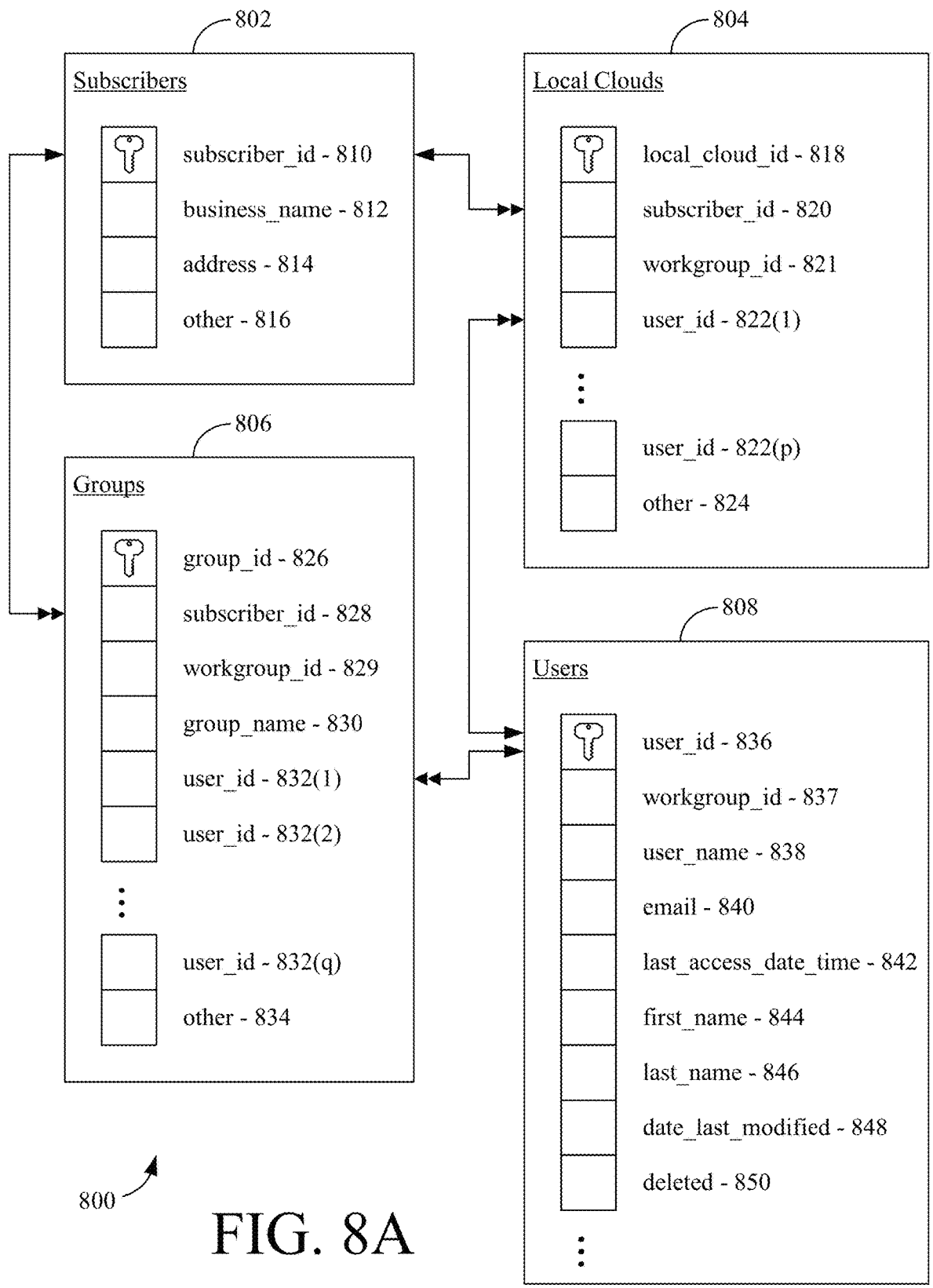
FIG. 8A shows an exemplary data structure for global user definitions stored in the global user directory of FIG. 6.

FIG. 8A shows an exemplary data structure 800 for user definitions stored on global user directory 610, which can be implemented, for example, in a MySQL database. Data structure 800 includes a subscribers table 802, a local clouds table 804, a groups table 806, and a first portion of a users table 808. Subscriber table 802 includes a subscriber_id field 810, a business_name field 812, an address field 814, and one or more other field(s) 816. Subscriber_id field 810 is the key field of subscriber table 802 and uniquely identifies a particular subscriber/customer (e.g., the construction company of FIG. 1). Business_name field 812 contains the name of the business (if applicable) associated with the particular subscriber. Address field 814 contains the mailing address (if applicable) of the particular subscriber. One or more other field(s) 816 can include any other information associated with the particular subscriber that is relevant to the implementation or otherwise useful about the associated subscribers (e.g., information indicative of a maximum number of power users that can be defined for the particular subscriber's subscription level, etc.).

Local clouds table 804 includes a local_cloud_id field 818, a subscriber_id field 820, a workgroup_id field 821, a plurality of user_id fields 822(1-$p$) and one or more other field(s) 824. Local_cloud_id field 818 is the key field of local clouds table 804 and contains data uniquely identifying a particular local cloud (e.g. local cloud server 104, local cloud server 106, etc.). Subscriber_id field 820 contains an identifier corresponding to a particular subscriber identifier 810 of a subscriber record of subscribers table 802. Workgroup_id field 821 contains data identifying a domain associated with the particular local cloud and users. User_id fields 822(1-$p$) contain identifiers uniquely identifying a plurality of users records in table 808 that are associated with users having local access to the associated local cloud server. One or more other field(s) 824 include any other information relevant or useful about the associated local cloud servers (e.g., HTTP endpoint information, etc.). There is a many-to-one relationship between the records of local clouds table 804 and the records of subscribers table 802, such that each subscriber identified by a subscriber field 810 can be associated with many local cloud records 818 (i.e. each customer can have a plurality of associated local cloud servers).

Groups table 806 includes a group_id field 826, a subscriber_id field 828, a workgroup_id field 829, a group_name field 830, a plurality of user_id fields 832(1-$q$), and one or more other field(s) 834. Group_id field 826 is the key field of groups table 806 and uniquely identifies a particular group record. Subscriber_id field 828 contains an identifier corresponding to a particular subscriber identifier 810 of a subscriber record in subscribers table 802. Workgroup_id field 821 contains data identifying a domain associated with the particular group. Group_name 830 contains the name of the particular group as it appears to administrators. User_id fields 832(1-$q$) contain identifiers uniquely identifying a plurality of users associated with records in users table 808 that are assigned to the particular group. One or more other field(s) 834 include any other information relevant or useful about a particular group (e.g., resources associated with the group, etc.). There is a many-to-one relationship between the records in groups table 806 and the records of subscribers table 802, such that each subscriber can be associated with a plurality of groups.

Users table 808 includes a user_id field 836, a workgroup_id field 837, a user_name field 838, an email field 840, a last_access_date_time field 842, a first_name field 844, a last_name field 846, a date_last_modified field 848, a deleted field 850, and other fields that will be discussed with reference to FIG. 8B below. User_id field 836 is the key field of users table 808 and uniquely identifies a particular user record/account. In a particular embodiment, user_id field 836 is a big integer and cannot contain a null value. Workgroup_id field 837 contains data identifying a domain associated with the user, which in a particular embodiment contains character data that cannot have a null value. User_name field 838 contains a variable character username of the particular user, can be used to authenticate the user, and in a particular embodiment cannot contain a null value. Email field 840 is a variable character field containing the email address of the particular user and can contain a null value. Last_access_date_time field 842 is a date/time field containing the last date and time that the particular user accessed the remote file system and can contain a null value. First_name field 844 is a variable character field containing the first name of the person associated with the particular user and can contain a null value. Last_name field 846 is a variable character field containing the last name of the person associated with the particular user and can contain a null value. Date_last_modified field 848 is a date/time field containing the date and time that the user record associated with the particular user was last modified and can contain a null value. Deleted field 850 is a tiny integer field containing a value indicating whether or not the particular user has been deleted as a user of remote cloud server 102 and can contain a null value.

Figure 8B:
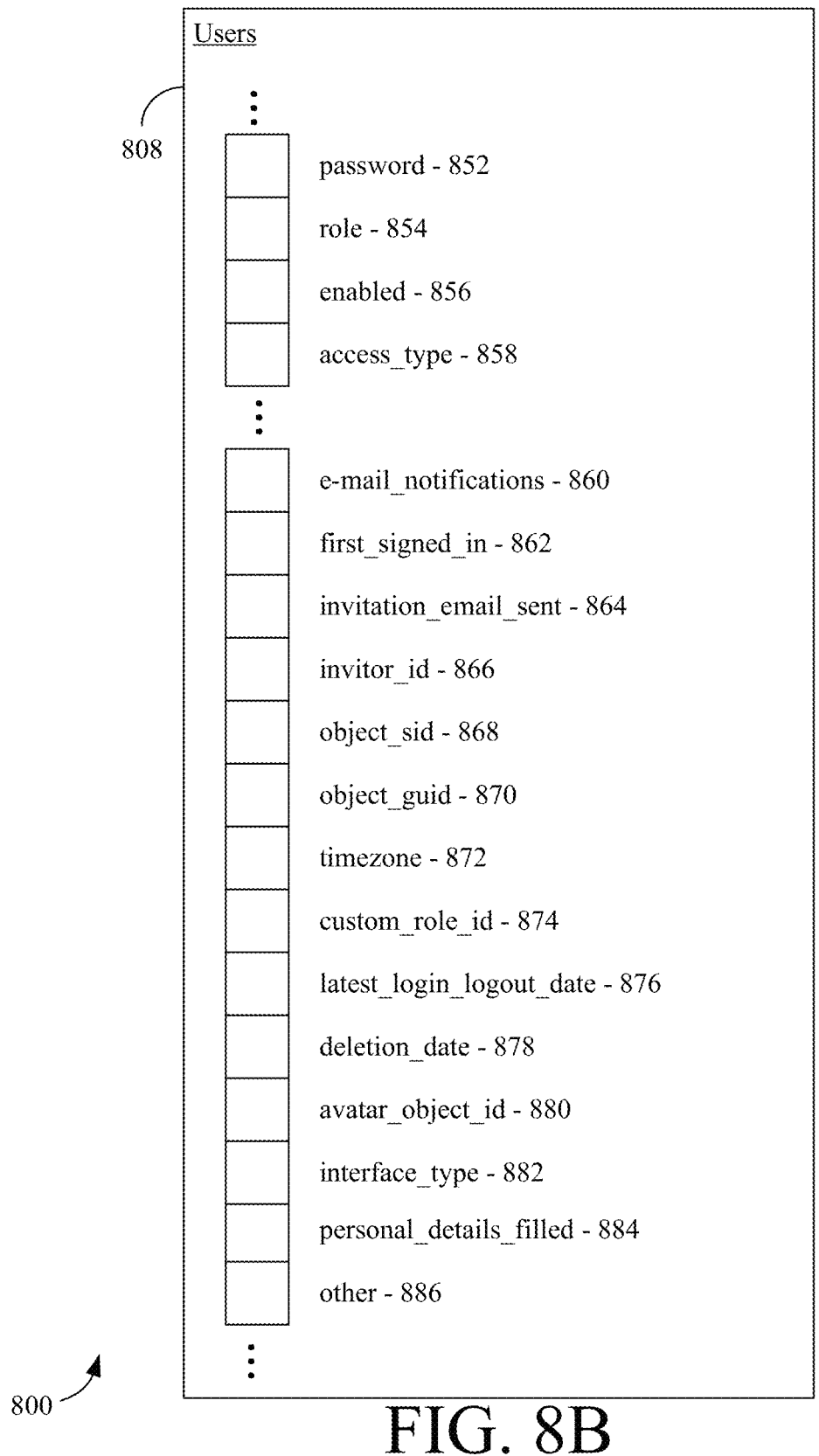
FIG. 8B is a continuation of the users table of FIG. 8A.

A second portion of users table 808 is shown in FIG. 8B. As shown, each users record further includes a passwords field 852, a role field 854, an enabled field 856, and an access type field 858. Password field 852 stores data indicative of the user's encrypted password. Role field 854 is a variable character field containing a user role (e.g. administrator, power user, limited user, etc.) and can contain a null value. The data in roles field 854 assigns abilities to the particular user. For example, a user with an administrator role can perform all functions. A user with a power user role can access files and folders in the remote file system, can be mapped to a local cloud server, and/or can have a custom role (e.g., have limited administrator privileges to billing, reports, users, groups, etc.). A user in a standard user role means a user having access only to the remote file system. Other roles are also possible (see e.g., custom_role_id below). Thus, the assignable roles of the invention enable authorization for various features, such as contributing content, collaboration with other uses for content in the cloud, running reports, accounts and data set controls, etc. Access_type field 858 is a variable character field containing data indicating which platforms (e.g. desktop, laptop, cellphone, etc.) that the user can use for file system access and can contain a null value.

The above-described fields of users table 808 enable user events (FIG. 9) to be generated and enable the elements of FIG. 7 to carry out their user state synchronization functionality. It should be noted, however, that users table 808 can contain other useful, although possibly less relevant, information. For example, users table 808 is shown to include an e-mail_notifications field 860, a first_signed_in field 862, an invitation_email_sent field 864, an invitor_id field 866, an object_sid field 868, an object_guid field 870, a timezone field 872, a custom_role_id field 874, a latest_login_logout_date field 876, a deletion_date field 878, an avatar_object_id field 880, an interface_type field 882, a personal_details_filled field 884, and one or more other field(s) 886.

E-mail_notifications field 860 is a tiny integer field containing a value indicating whether e-mail notifications are enabled for the particular user and can contain a null value. First_signed_in field 862 is a tiny integer field containing a value indicating whether or not the user has previously signed in and can contain a null value. Inviation_email_sent field 864 is a tiny integer field containing a value indicating whether or not the associated user was sent an e-mail invitation (e.g., to register) and can contain a null value. Invitor_id field 866 is a big integer field containing an identifier of another user that invited this user and can contain a null value. Object_sid field 868 is a variable character field containing data indicative of a security identifier associated with the user that was imported from the user's origin directory (HQ user directory 116), if the user was imported, and can contain a null value. Object_guid field 870 is a character field containing a globally unique identifier corresponding to the user and imported from the user's origin directory, if the user was imported, and can contain a null value. Timezone field 872 is a variable character field containing data indicating which time zone the user is located in and can contain a null value. Custom_role_id field 874 is a variable character field containing a custom user role (e.g. billing) and can contain a null value. Latest_login_logout_date field 876 is a date/time field containing the date and time that the user last logged in or logged out and can contain a null value. Deletion_date field 878 is a date/time field containing the date and time that the user was deleted and can contain a null value. Avatar_object_id field 880 is a variable character field containing an object id uniquely identifying a picture file to be displayed as the user's avatar. Interface_type field 882 is a variable character field containing data indicative of the default login view for the user. Personal_details_filled field 884 is a tiny integer field containing a value indicating whether or not the user has inputted personal details (e.g. birthdate, name, etc.) and can contain a null value. Users table 808 can contain more (other field(s) 886) or fewer fields depending on the needs of the client.

There is a one-to-many relationship between users and local clouds (i.e. each user can have access to multiple local cloud servers) and between users and groups (i.e. each user can be a member of a plurality of groups). Additionally, it should be understood that data structure 800, as well as the other data structures provided herein, are exemplary in nature and are intended to facilitate a better understanding of the invention. It should be understood that these data structures 800 can be modified according to a particular implementation as desired.

Returning now to FIG. 7, data structure 800 is useful in several ways. First, cloud directory services module 702 can utilize the tables of global user directory 610 to build graphical representations of the user spaces 402, 412, 414, etc. for administrator 700 based on the local cloud records in table 804 and the user records in table 808 that are associated with a particular subscriber in table 802. Accordingly, the user-to-local-cloud map for the customer is readily available. Module 702 can also use the information in database 610 to compile and present administrator 700 with a list of power users that are available for mapping to the particular local cloud servers associated with a particular subscriber based on the records of users table 808 and the information in their role fields 854. The administrator can also be provided with a list of users assigned to particular groups, etc. Indeed, various presentations are available to be made to administrator 700 depending on the needs of the cloud computing system.

Administrator 700 can also add, delete, or update user information by creating, deleting, or updating user records 808. Similarly, administrator 700 can add or remove local cloud access for particular power users by associating those users with the available local clouds via the graphical user interface. Additionally, a new local cloud server can be quickly added to a customer's cloud computing system, and available power users can be readily mapped to it, from a centralized configuration point provided by remote cloud server 102. In response to any changes from administrator 700, cloud directory services module 702 updates the appropriate tables of cloud user directory 610 (e.g., adding a field 822 in a local cloud record of table 804 to grant a power user local access, adding a new local cloud server by creating a new record 818 in table 804, etc.). In response, remote user synchronizer 704 creates and processes user events to propagate any updated states of global user directory 610 to the appropriate local cloud servers.

Figure 9:
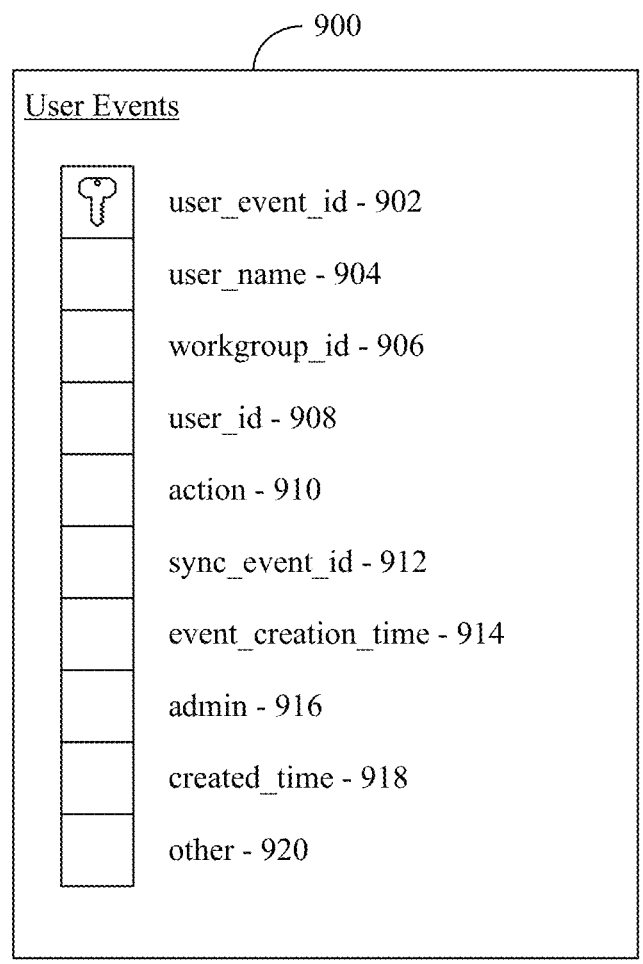
FIG. 9 shows an exemplary data structure for user events stored in the user events database of FIG. 7.

FIG. 9 shows an exemplary data structure for user events generated by remote user synchronizer 704 and stored in user events database 706. User events table 900 includes a user_event_id field 902, a user_name field 904, a workgroup_id field 906, a user_id field 908, an action field 910, a sync_event_id field 912, an event_creation_time field 914, an admin field 916, a created_time field 918, and one or more other field(s) 920.

User_event_id field 902 is the key field of user events table 900 and uniquely identifies the particular user event. In this embodiment, user_event_id field 902 is a monotonically-increasing integer identifier and cannot contain a null value. User_name field 904 is a variable character field containing an alphanumeric character string indicating a user name of the user record in table 808 affected by the particular event and cannot contain a null value. Workgroup_id field 906 is a character field containing a domain identifier associated with the particular user. User_id field 908 is a big integer field containing an identifier identifying the particular user in table 808 that was affected by the particular event and cannot contain a null value. Action field 910 is a variable character field containing data indicative of a particular change to a user record (e.g. ADD_USER, DELETE_USER, INVALIDATE_PASSWORD, ACTIVATE, DEACTIVATE, UPGRADE, DOWNGRADE, etc.) that triggered the particular event and cannot contain a null value. The data in action field 910 is used to instruct the local cloud to perform the required change such as add a local user, delete a local user, invalidate a local user's password, activate a particular user for local access, deactivate a particular user for local access, upgrade the role of a local user, downgrade the role of a local user, assign a user to a group, remove a user from a group, etc. Indeed, different actions represented by field 910 can be added, removed, or modified depending on the particular implementation.

Sync_event_id field 912 is a character field containing a universally unique identifier that uniquely identifies an event across services that do not have access to the same databases (e.g., to user events database 706, etc.) and cannot contain a null value. Event_creation_time field 914 is a big integer field containing a time (and optionally date) when the particular event was created and cannot contain a null value. Admin field 916 is a tiny integer field containing a value indicating whether or not the user affected by the particular event is an administrator and can contain a null value. Created_time field 918 is a date/time field indicating the time (and optionally date) the user or group object affected by the particular event was created. Other field(s) 920 can include any other information relevant to the particular event. Additionally, user events table 900 can include more or fewer fields based on the needs of the particular client.

Figure 10A:
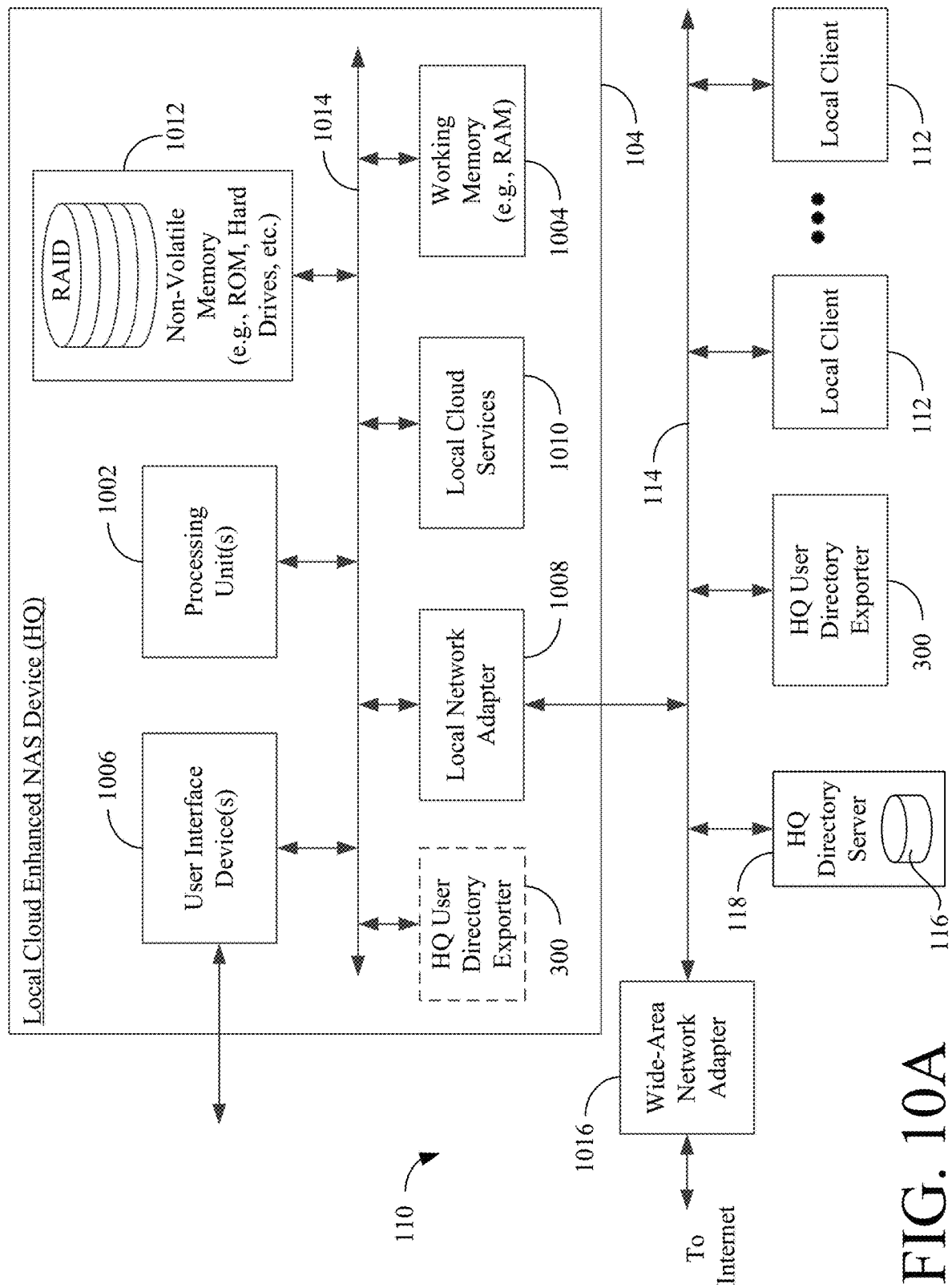
FIG. 10A is a block diagram showing the headquarters 110 of FIG. 1 in greater detail.

FIG. 10A is a block diagram showing local cloud server 104 and headquarters 110 in greater detail. In this particular embodiment, local cloud server 104 is a local-cloud-enhanced network attached storage (NAS) device that includes one or more processing units 1002, working memory 1004, one or more user interface devices 1006, a local network adapter 1008, a local cloud services component 1010, and non-volatile memory 1012, which all intercommunicate via an internal bus 1014. Processing units(s) 1002 impart functionality to local cloud server 104 by executing code stored in any or all of non-volatile memory 1012, working memory 1004, and local cloud services 1010. Working memory 1004 includes random access memory (RAM) for temporarily storing active programs and data. User interface devices 1006 enable local IT personnel to access local cloud server 104, e.g., for firmware upgrades, software upgrades, etc. Local network adapter 1008 facilitates communication between the elements of local cloud server 104 and local network 114. Non-volatile memory 1012 provides local storage for a local file system of the construction company and, by way of example, is shown to include a set of hard drives arranged in a RAID configuration. The construction company's local file system can be accessed by local clients 112 via local network 114.

Local cloud services 1010 represents hardware, software, firmware, or some combination thereof, that provides the various local cloud server functions, including the user state synchronization functionality, described herein. All or parts of local cloud services 1010 can be deployed on (installed on) local cloud server 104, for example, as downloadable software from the cloud computing service provider operating remote cloud server 102. Local cloud services 1010 also provides local file system access services (e.g., drive mapping, etc.) to local clients 112. The file storage functionality of local cloud services 1010 will not be described in detail herein, except to the extent it relates to the user state synchronization aspects, so as not to unnecessarily complicate this disclosure.

Local cloud server 104, local clients 112, HQ directory server 118, and HQ user directory exporter 1018 are all coupled to, and in communication by, local network 114. Local network 114 is also coupled to wide-area network adapter 1016 facilitates communication with Internet 108 and, thus, red server 202 and remote cloud server 102 (FIGS. 1-2).

As shown in this example embodiment, HQ user directory exporter 300 is installed at the headquarters 110 of the construction company. For example, HQ user directory exporter 300 can be downloaded from remote cloud server 102 and installed onto a computer system at the headquarters 110. It will be understood, therefore, that such a computer system will include hardware componentry (e.g., similar to that of local cloud server 104) that is sufficient for exporter 300 to carry out its intended functions. Optionally, exporter 300 can even be installed on local cloud server 104 as illustrated.

Figure 10B:
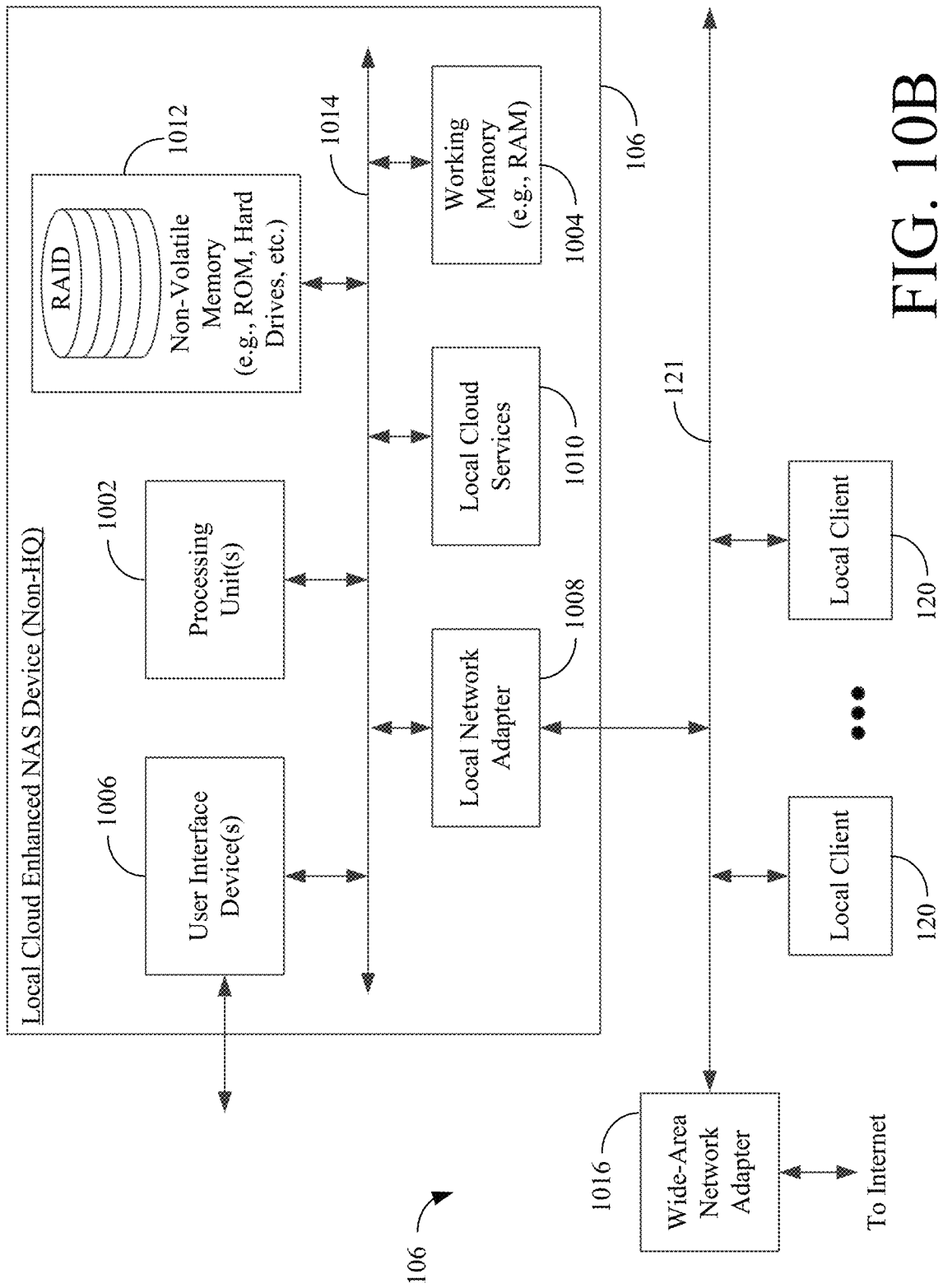
FIG. 10B is a block diagram showing remote site 119 of FIG. 1 in greater detail.

FIG. 10B is a diagram showing construction site 119 and local cloud server 106 in greater detail. Local cloud server 106 is substantially similar to local cloud server 104, except that local cloud server 106 is not connected to a local network that has access to an HQ directory server or HQ user directory. Accordingly, site 119 (and local cloud server 106) also does not include an HQ user directory exporter 300. Non-volatile memory 1012 also includes a local file system and local user directory (FIG. 12) that are synchronized with the remote file system and global user directory 610, respectively, on remote cloud server 102. Note also that the elements of FIG. 10B can apply equally to other local cloud sites (e.g., other construction sites) associated with the construction company.

Notably, FIGS. 10A and 10B illustrate that the local cloud servers 104 and 106 at the HQ and non-HQ locations can be substantially similar. As another option, HQ user directory exporter 300 can be installed in communication with HQ directory server 118 at a location that does not also include a local cloud server.

Figure 11:
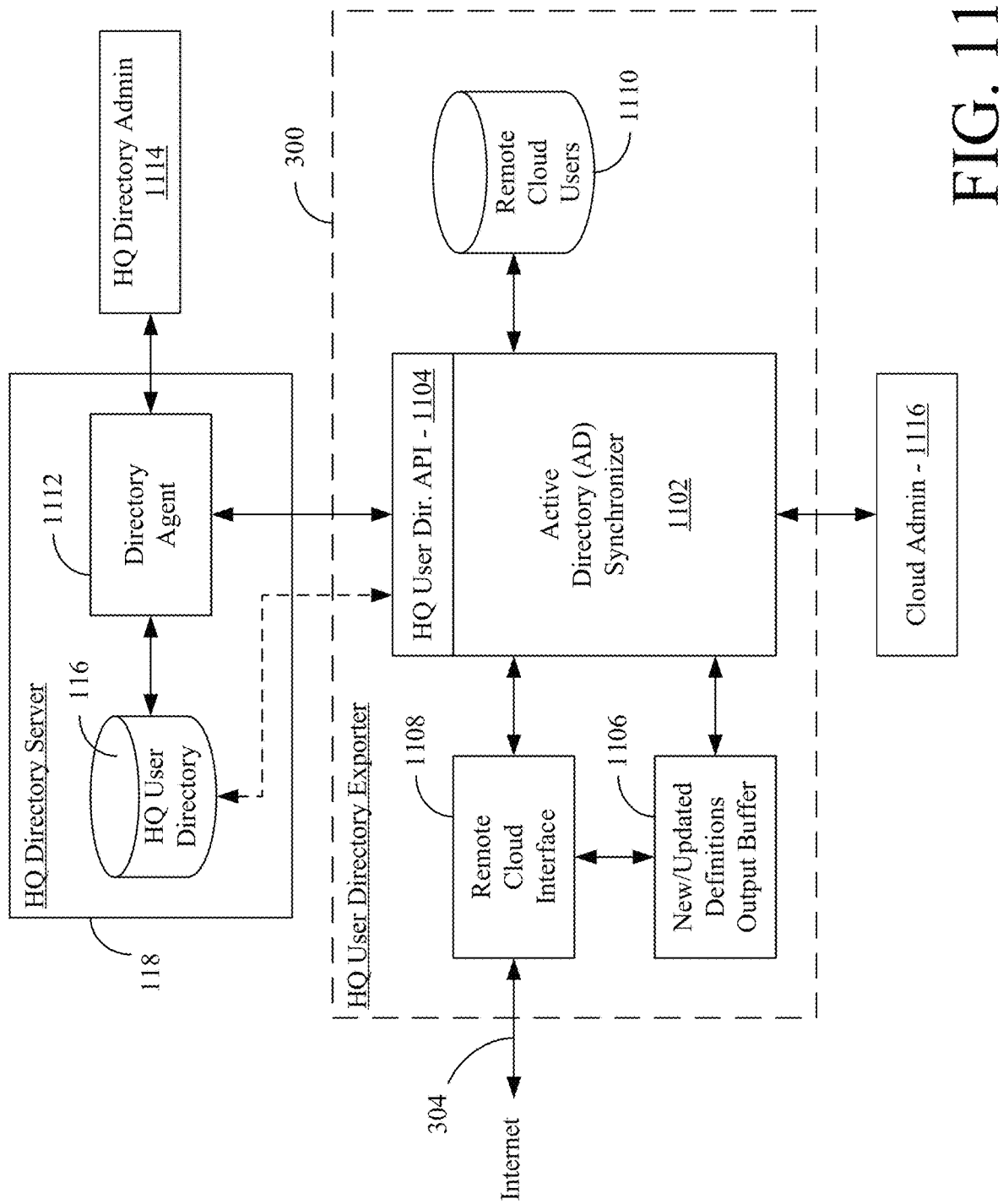
FIG. 11 is a relational diagram showing functional aspects of the HQ User Directory Exporter of FIGS. 3A and 10A in greater detail.

FIG. 11 is a block diagram showing the functional aspects of HQ user directory exporter 300 in greater detail. As shown, exporter 300 includes an active directory (AD) synchronizer 1102, an HQ user directory API 1104, a definitions output buffer 1106, a remote cloud interface 1108, and remote cloud user storage 1110. FIG. 11 further shows that HQ directory server 118 includes a directory agent 1112 with access to HQ user directory 116. In a particular embodiment, HQ directory server 118 implements Microsoft's Active Directory (AD) service. Accordingly, directory agent 1112 can modify HQ users responsive to commands from a user on a separate administrative connection 1114. It will be understood also that HQ user directory exporter 300 and HQ directory server 118 will be installed on computer systems that provide the necessary hardware (e.g., processing units, memory, network connectivity, etc.) to facilitate their operations.

AD synchronizer 1102 facilitates initial synchronization between at least some of the user definitions in HQ user directory 116 and the cloud user definitions stored in cloud user directory 610. For the initial synchronization (e.g., when an account is first opened with the cloud service provider operating remote cloud server 102 and no user definitions exist in global user directory 610), AD synchronizer 1102 requests the HQ user definitions, including users, groups, and user-group mappings, stored in HQ user directory 116 from directory agent 1112 via API 1104. (Alternatively, API 1104 can be configured to access HQ user directory 116 directly, as shown in the broken line.) Directory agent 1112 optionally authenticates exporter 300 and/or administrator 1116 for HQ user directory access, and thereafter queries HQ user directory 116 for the requested user view, receives it, and provides it to AD synchronizer 1102.

AD synchronizer 1102 receives the HQ user definitions (e.g., corresponding to ellipse 404 in FIG. 4) and provides the HQ users, groups, and user-group mappings to an administrator 1116 who has previously logged in and authenticated with AD synchronizer 1102. Administrator 1116 selects which users (e.g., through a user interface exported by HQ directory synchronizer 1102) are to be synchronized with global user directory 610. AD synchronizer 1102 then exports the selected HQ user definitions, including users, groups, and user-group mappings to output buffer 1106, optionally mapping them to a format that is recognizable by remote cloud server 102. AD synchronizer 1102 then forwards the user definitions in output buffer 1106 to remote cloud server 102 via remote cloud interface 1108 (comprising REST APIs) and connection 304. Alternatively, exporter 300 can include a RED interface (not shown) to facilitate Web Socket communications with remote cloud server 102 via RED server 202.

For a (re-) synchronization where global user definitions exist in global user directory 610, AD synchronizer 1102 requests a snapshot of the users, groups, and user-group mappings of global user directory 610 from remote cloud server via remote cloud interface 1108. HQ directory synchronizer 716 (FIG. 7) of remote cloud server 102 returns the requested user snapshot to AD synchronizer 1102, which AD synchronizer 1102 stores in remote cloud users storage 1110. Thereafter, AD synchronizer 1102 intersects the cloud user definitions in storage 1110 with corresponding HQ user definitions in directory 116 via API 1104 and/or directory agent 1112 to determine what changes in the HQ user definitions 116 need to be synchronized with the global user directory 610 on remote cloud server 102. AD synchronizer 1102 then generates the necessary updates, optionally in response to input from administrator 1116, to add, remove, or update records in global user directory 610 and temporarily stores them in buffer 1106. Thereafter, AD synchronizer 1102 causes the user definition updates to be communicated to remote cloud server 102 via remote cloud interface 1108 and a connection 304.

In the above manners, HQ user directory exporter 300 facilitates both initial synchronization and re-synchronization of the desired portions of HQ user directory 116 with the cloud user directory 610. AD services module 1102 can trigger a re-synchronization between the HQ users and cloud users at predetermined time intervals, such as once a day, once a week, every 15 minutes, etc., or at the request of administrator 1116 and/or 1114. As still another option, directory agent 1112 can be configured to notify AD synchronizer 1102 of any changes, so it can be determined if the changes needs to be communicated to remote cloud server 102.

FIG. 12 is a relational diagram showing the functional aspects of local cloud server 104 in greater detail for providing local access to its local file system. (Note the elements of FIG. 12 apply equally to local cloud server 106.) In the illustrated embodiment, the functional aspects are provided by local cloud services 1010 but could be distributed across other service modules or even other machines.

Local client 112 (e.g., a Windows client) is a device and/or process used by a local user to access (e.g., read, write, modify, etc.) the local file system stored on local cloud server 104. Local client 112 connects with LFS handler 1202 using an interface/protocol (e.g., Samba, CIFS, etc.) through which local client 112 can access and modify the local file system. In a particular embodiment, LFS handler 1202 implements Microsoft's CIFS file access protocol so that local client 112 can map the local file system as a network mapped drive. Responsive to local client 112, LFS handler 1202 calls a local virtual file system (VFS) module 1206.

Local VFS module 1206 presents a virtual file system (e.g., a directory tree view) to local client 112 in accordance with user accounts and permissions. Local VFS module 1206 calls a permissions enforcement module 1208, which authenticates the user associated with local client 112 against a local user directory 1210. If the local user is authenticated, permissions enforcement module 1208 also enforces local file system permissions associated with the user based on a local file system (LFS) permissions map 1212. If the user cannot be authenticated against the local user definitions stored in local user directory 1210, then access is denied for local client 112. Enforcement of local file system permissions is further described in detail in U.S. Pat. No. 9,483,491, which is incorporated by reference herein in its entirety.

Responsive to permissions enforcement module 1208 authenticating a user, local VFS module 1206 accesses LFS metadata 1214 to provide local client 112 with a hierarchical virtual file system (e.g., a directory tree view of folders and files) consistent with the associated user's file system permissions stored in LFS permissions map 1212. Local client can then interact with the virtual file system and make changes to file system objects. When a data file needs to be uploaded to, downloaded from, or deleted from non-volatile memory 1012, local VFS module 1206 utilizes a LFS object I/O module 1216 to facilitate the data file transfer to or from non-volatile memory 1012. A local filesystem synchronization services module 1218 synchronizes at least a portion the local file system with the remote file system stored on remote cloud server 102 via a remote cloud interface 1220. Systems and methods for file system synchronization have been incorporated by reference as discussed above.

In the present embodiment, local user directory 1210 comprises a pair of files storing the local user definitions for the power users mapped to the local cloud server (e.g., ellipse 412 of FIG. 4 in the case of local cloud server 104). More specifically, a first file in local user directory 1210 contains a list of local users, whereas a second file (a shadow file) contains other information associated with the list of local users including, for example, passwords and security settings.

The first file "/etc/passwd" contains a list of mapped local users in the following format:

user1:x:1234567890:0987654321:John_Buck:/user1:/bin/bash wherein "user1" is the local user's username, "x" is a placeholder for the user's password, which is stored in the shadow file, "1234567890" is a numeric user id assigned by the local operating system, "0987654321" is a numeric group id assigned by the local operating system, "John_Buck" is the full name of the person corresponding to the user, "/user1" is the user's home directory, and "/bin/bash" is the user's shell.

The shadow file "/etc/shadow" contains a list of entries, where each entry is associated with a local user entry in the first file. The entries in the shadow file have the following format:

user1:$6$VLueHZHS$12316L5FTGbRyrxjNHK . . . : 16106:0:999999:7:14:Expire wherein "user1" is the local user's username as in the first file, "6$VLueHZHS$12316L5FTGbRyrxjNHK . . . " is the user's encrypted password, "16106" is a number indicating when the password was last changed (e.g., the number of days since Jan. 1, 1970), "0" is a number indicating the minimum number of days required between password changes, "999999" is a number indicating the maximum number of days allowed between password changes, "7" is a number indicating the number of days before the password is to expire that the user is warned, "14" is a number indicating the number of days after the password expires that an account associated with the user is disabled, and "Expire" represents an absolute date indicating when the user will no longer be allowed to login.

Thus, in the present embodiment, the local user definitions in local user directory 1210 are simpler than the global user definitions stored in global user directory 610. However, it will be understood that the local user definitions described herein are exemplary in nature and can be modified as desired for a particular application (e.g., to include group and/or user-group mapping information, etc.). However, such detail has been omitted herein so as not to unnecessarily complicate the present disclosure.

Figure 13:
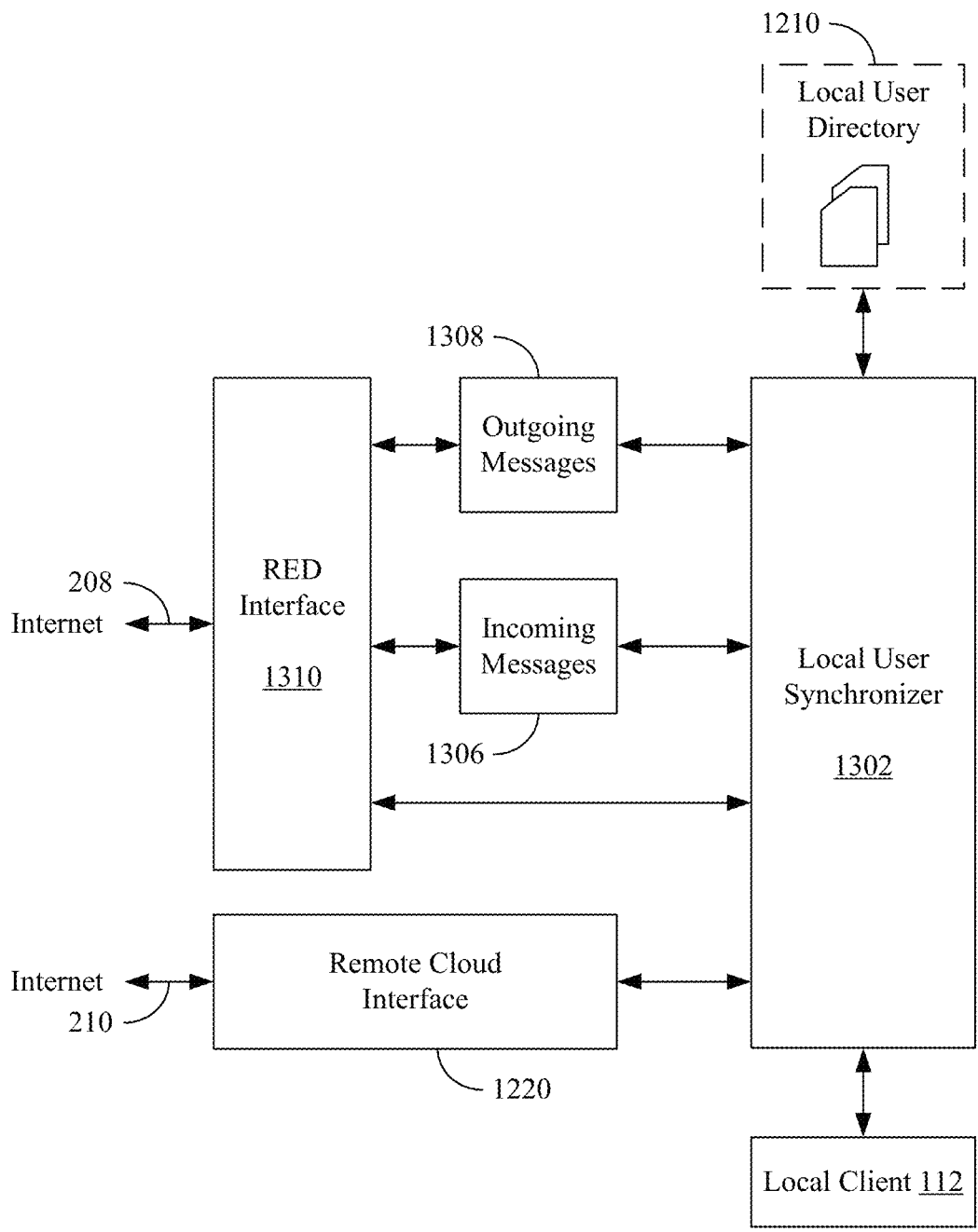
FIG. 13 is a relational diagram showing functional aspects related to user state synchronization on the local clouds of FIGS. 10A and 10B.

FIG. 13 is a block diagram showing user state synchronization aspects of local cloud server 104 in greater detail. (Note that elements of FIG. 13 apply equally to local cloud server 106.) In the illustrated embodiment, the functional aspects of FIG. 13 are provided by local cloud services 1010 but could be distributed across other service modules or even other machines. FIG. 13 shows that local cloud services 1010 further includes a local user state synchronizer 1302, an incoming messages buffer 1306, an outgoing messages buffer 1308, and a red interface 1310.

Local user synchronizer 1302 provides user state synchronization services for local cloud server 104. Incoming messages buffer 1306 provides temporary storage for incoming event messages originating from remote cloud server 102. Outgoing messages buffer 1308 provides temporary storage for outgoing messages generated by local user synchronizer 1302. Red interface 1310 establishes and maintains Web-Socket connection 208 on behalf of local cloud server 104. Remote cloud interface 1220 establishes and maintains other connection(s) 210 with remote cloud server over Internet 108, for example, for performing snapshot-based synchronizations of local user directory 1210 and global user directory 610.

When local cloud server 104 is online and accepting local user access, local user synchronizer 1302 establishes a Web Socket connection 208 (subscribes) to RED server 202. More specifically, local synchronizer 1302 opens a single connection to RED server 202 in the context of the administrator that setup/installed local cloud server 104, and then authenticates the administrator with RED server 202 (e.g., via a provided password, an OAuth token, etc.). Based on this authentication process, RED server 202 derives the username of the administrator, an associated workgroup (domain) of that administrator, and a local cloud server identifier. As explained more below, RED server 202 then registers the connection (if authorized) in the contexts of the local cloud server, the workgroup, and the administrator, and makes the connection discoverable to remote cloud server 102 over Web Socket connection 206. Thus, a single connection 208 between RED server 202 and local user synchronizer 1302 is used to communicate user events for all power users that are mapped to local cloud server 104.

When a change is made to the state of a global user definition stored in global user directory 610 for a user that has been mapped to local cloud 104, remote cloud server 102 generates and communicates a user event message to local cloud server 104 via RED server 202. RED interface 1310 receives such user events from remote cloud server 102 via RED server 202 and temporarily stores them in incoming messages buffer 1306. In other embodiments, incoming event messages are processed immediately by local user synchronizer 1302 and incoming messages buffer 1306 is eliminated.

Each incoming user event message is formatted as a JSON object as follows:

```
{
    "messageId" : "<alphanumeric random id>",
    "message" : { "action" : ["invalidatepass" | "userupdate" | "activate" | "deactivate" |
        ... | ... ],
        "username" : "<user_name>",
        "actionCreationTime": 1234567890
    }
},
``` wherein "messageID" is an alphanumeric identifier (e.g., corresponding to an event identifier, a random identifier, etc.), "action" corresponds to an action described in action field 910 of an associated user event record 902, "username" corresponds to the affected user's username stored in "user_name" field 904 of the associated event record 902, and "actionCreation time" corresponds to the event_creation_time field 918 of the user event record 902. The message can also include a Web Socket header added to the message (payload) by remote cloud server 102, unless such header was stripped from the message by RED server 202 prior to delivering the message to local cloud server 104.

Local user synchronizer 1302 retrieves each received user event message from incoming message buffer 1306 (e.g., in a FIFO fashion), processes the user event message, and makes changes to local user directory 1210 based on the change (action) for that user indicated in the user event message. If, however, the message is not intended for a local user on the local cloud server 104, but local cloud server 104 receives the message anyway (e.g., due to its inclusion in a particular workgroup, etc.), local user synchronizer 1302 ignores (discards) the message.

Additionally, if local user synchronizer 1302 successfully applies a user event to local user directory 1210, then synchronizer 1302 can generate a reply message to RED server 102 indicating that the user event was successfully applied locally. However, if synchronizer 1302 was not able to apply the change in local user directory 1210, then synchronizer generates a failure message to RED server 102. Synchronizer 1302 stores the reply messages that it generates in outgoing messages buffer 1308. Responsive to messages in buffer 1308, RED interface 1310 forwards the messages to RED server 102, for example, by packaging the message for Web Socket communication and communicating the message to RED server 202.

In a particular embodiment, reply messages generated by local user synchronizer 1302 are JSON objects having the following format:

```
{
    "messageId" : "<alphanumeric random id>",
    "status" : ["ok" | "fail"],
    "details" : "<detailed string explaining the status>"
},
``` wherein "messageID" is an alphanumeric random identifier, "status" indicates if the related incoming user event message was successfully applied ("ok") or if application failed ("fail"), and "details" provides additional information regarding the success or failure. Such reply messages can be simply stored in a log on RED server 202 (e.g., for error correction purposes by the cloud service provider) and/or can be provided to remote cloud server 102 to determine if an event message retry is warranted.

Local user synchronizer 1302 also carries out snapshot-based rescan-type synchronizations between local user directory 1210 and the locally-mapped portion of global user directory 610 via remote cloud interface 1220. For this type of synchronization, local user synchronizer requests a snapshot of the user space (e.g., user space 412) of global user directory 610 that has been mapped to local cloud server 104 (e.g., using REST APIs over remote cloud interface 1220). Responsive to receiving the snapshot, local user synchronizer 1302 compares the cloud user definitions in the snapshot, on a user-by-user basis, with the local user definitions in local user directory 1210 and makes any necessary changes to local user directory 1210 so that all local user definitions are synchronized with the cloud user definitions on remote cloud server 102. Snapshot-based synchronization can be performed at some predetermined interval and/or when local cloud server 104 transitions from an off-line state to an online state, for example, so that any user state changes that occurred while offline can be applied quickly after local cloud server comes back online. A snapshot-based synchronization can also be performed on a user-by-user basis, for example, when a user initially logs into local cloud server 104.

In still another embodiment, local user synchronizer 1302 can perform a "catch-up" synchronization after local cloud server 104 returns online over the RED interface 1310. In such a case, local user synchronizer 1302 can send an identifier to remote cloud server 102 that identifies the last event message that it received. Remote cloud server 102 can then resend any later-generated event messages to local cloud server 104 over RED server 202, so that local user synchronizer 1302 can apply the related user state changes locally.

Finally, local user synchronizer 1302 enables a local client 112 (e.g., a local user with an administrative role) to access local user directory 1210 to view the local users mapped thereto. Local user synchronizer 1302 can also extend user access to remote cloud server 102 via remote cloud interface 1220, for example, so an administrator can modify the user-mapping in global user directory 610, a local user can change his/her password, etc.

FIG. 14 is a table 1400 showing the relationships between actions that modify global user directory 610 and their corresponding effects on the local user directory of local cloud server 104 and/or 106. A first column 1402 includes a list of actions that can be carried out against global user directory 610, and a second column 1404 includes a list of the corresponding effects that are implemented on the local user directory 1210 of at least one of local cloud servers 104 and 106.

When a power user is created in global user directory 610, a user is also created locally. When a user's password in global user directory 610 is synchronized with a local cloud server, the password is updated for the corresponding user locally. When a password is changed for a power user in global user directory 610, the user's password is invalidated locally. When a user's role is changed from limited user to power user in global user directory 610, a corresponding local user is created. When a power user is deleted in global user directory 610, the corresponding local user is disabled (e.g., by moving the user entry to a designated file, modifying the "Expire" data in the shadow file, etc.). When a power user is deactivated, the corresponding local user is disabled. When a user's role is changed from power user to limited user in directory 610, the corresponding local user is disabled. When a power user is enabled in directory 610, the corresponding local user is enabled. When a "forgot password" notice regarding a user is received in remote cloud server 102, the password is invalidated for the corresponding local user. When a user's password is reset by an administrator in directory 610, the password is invalidated for the corresponding local user. When a user's password is reset by security policy 720 in directory 610, the password is invalidated for the corresponding local user. When any action except for a change in the user role is carried out against a limited user in directory 610 (those users in user space 410 in FIG. 4), there is no action performed locally.

Figure 15:
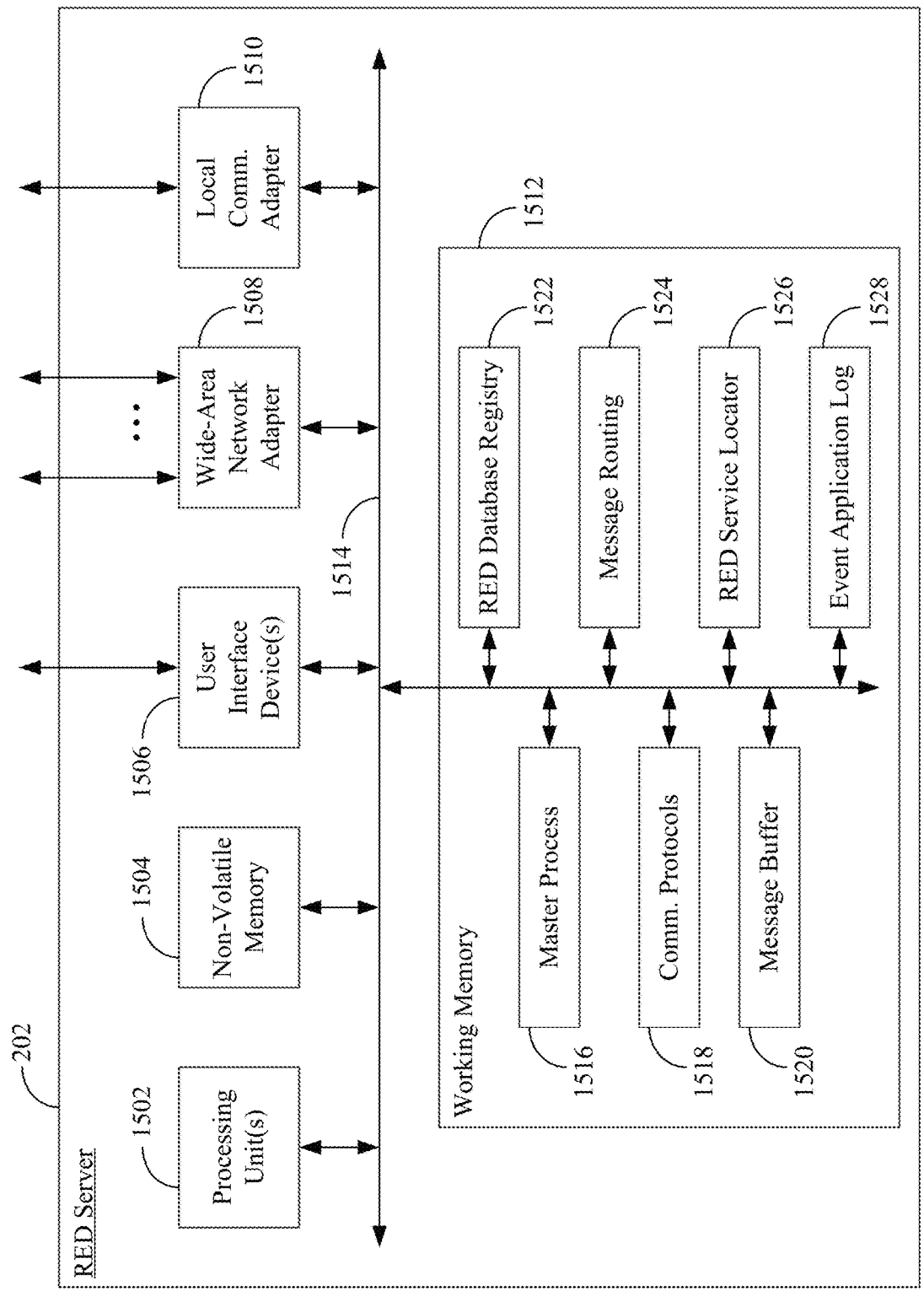
FIG. 15 is a block diagram showing the RED server of FIGS. 3A and 3B in greater detail.

FIG. 15 is a block diagram showing an exemplary embodiment of RED server 202 in greater detail. RED server 202 includes one or more processing unit(s) 1502, non-volatile memory 1504, user interface device(s) 1506, a wide-area network adapter 1508, a local communication adapter 1510, and working memory 1512, all intercommunicating via an internal bus 1514. Processing units(s) 1502 impart functionality to RED server 202 by executing code stored in one or both of non-volatile memory 1504 and working memory 1510. User interface devices 1506 enable a RED administrator access to RED server 202. Wide area network adapter 1508 provides a means for RED server 202 to communicate with remote cloud server 102, local cloud server 104, and local cloud server 106 via Internet 108 and associated Web Socket connections 208. Local communication adapter 1510 provides RED server 202 access to a local network or other local bus system, for example, where RED server 202 is operating in a data center with other servers (e.g., other RED servers, remote cloud servers 102, etc.).

Working memory 1512 contains software modules that impart functionality to RED server 202, including a master process module 1516, various communication protocols 1518, a message buffer 1520, a RED database registry 1522, a message routing module 1524, a RED service locator 1526, and an event completion log 1528. Master process module 1516 includes code for directing the overall functionality of RED server 202. Communication protocols 1518 include the various communication protocols and APIs needed by RED server 202 to carry out its intended functions and include, for example, HTTP, TCP, IETF RFC 6455 WebSocket protocol, WebSocket API, etc. Message buffer 1520 provides temporary storage for WebSocket messages being routed by RED server 202. Red database registry 1522 stores data identifying each local cloud server that has established a connection with (subscribed to) RED server 202. Optionally, red database registry 1522 can also store data identifying established remote cloud connections (e.g., in the case of multiple operating remote cloud servers 102) and/or information on the operational status of other RED service nodes. Message routing module 1524 includes code for routing Web Socket messages based on the destination(s) of those messages and the information in RED database registry 1522. Red service locator 1526 includes code that enables remote cloud server 102 to access information in RED database registry 1522 so that remote cloud server 102 can send event messages to the appropriate local cloud destinations.

In addition to the user state synchronization aspects, RED server 202 can facilitate various other cloud-based services. These services include, but are not limited to, monitoring client behavior and/or performance in real time, controlling client behavior by pushing control messages to client servers in real time, and pushing software upgrades to client servers.

Figure 16:
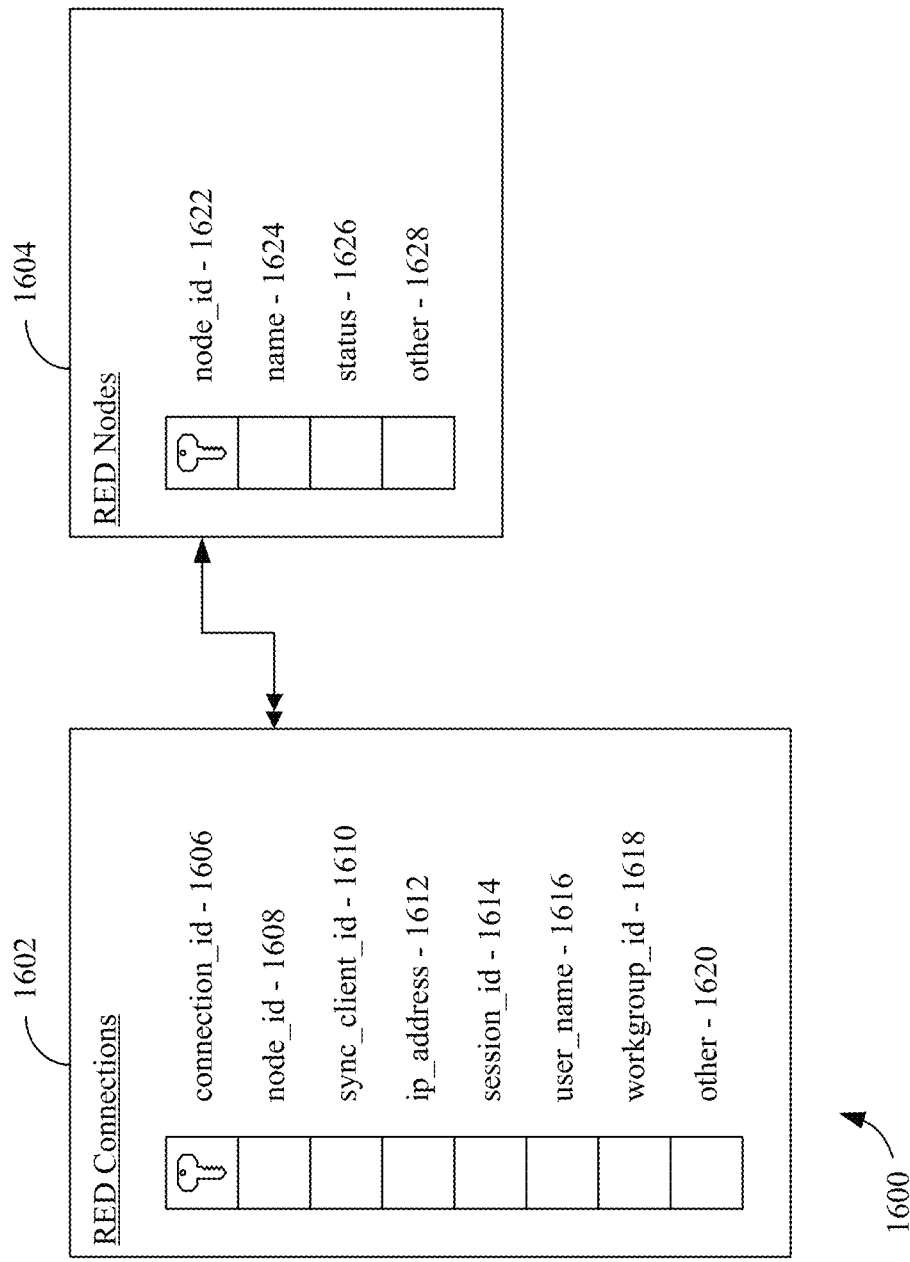
FIG. 16 shows an exemplary data structure for the RED database registry of FIG. 15.

FIG. 16 shows an exemplary data structure 1600 for RED database registry 1522. Data structure 1600 includes a RED connections table 1602 and a RED nodes table 1604. Each record in RED connections table 1602 includes a connection_id field 1606, a node_id field 1608, a sync_client_id field 1610, an ip_address field 1612, a session_id field 1614, a username field 1616, a workgroup_id field 1618, and one or more other field(s) 1620.

Connection_id field 1606 is the key field of RED connections table 1602 and contains data (e.g., integer type, not null, auto-incrementing) that uniquely identifies a connection with RED server 202. Node_id field 1608 contains data (e.g., integer type) uniquely identifying the RED server 202 that the connection is established on. Sync_client_id field 1610 contains data (e.g., variable character type) identifying the connected client (e.g., a connected local cloud server identifier corresponding to local_cloud_id field 818 of table 804, a remote cloud server identifier, etc.). IP_address field 1612 stores data (variable character type) indicative of the connected client's IP address. Session_id field 1614 stores an internal session identifier (variable character type) for the RED connection. User_name field 1616 stores the username (variable character type) of the connection owner (the local cloud administrator associated with the RED connection). User_name field 1616 includes data corresponding to a user name stored in user_name field 838 of a corresponding user record 808. Workgroup_id field 1618 stores a domain identifier (character type) for the connection owner. One or more other field(s) 1620 can include any other information useful for the particular RED implementation.

RED connections table 1602 illustrates how connections can be established on a RED server 202 in the context of a particular local cloud server (e.g., via sync_client_id 1610), in the context of a particular connection owner/administrator (field 1616), and/or in the context of a particular workgroup (field 1618) when those connections are established with respective local cloud servers. Thus, remote user synchronizer 704 (FIG. 7) of remote cloud server 102 can query RED connections table 1602 via RED Service Locator 1526 to locate a particular connected local cloud server, all connected local cloud servers associated with a particular workgroup, and/or any connection associated with a particular administrator. Accordingly, remote cloud server 102 can target user event messages for delivery to the desired local cloud servers in a very flexible manner. For example, remote cloud server 102 can target an event message to a particular local cloud device, can target all local cloud devices of a particular workgroup, or can target a local cloud device associated with a particular administrator. Remote user synchronizer 704 can add a header to each user event message so that the user event message is provided to the desired destination(s) (e.g., every local cloud server associated with a particular workgroup, etc.).

RED Nodes table 1604 is a table that identifies all RED servers 202 servicing the cloud computing system, and indicates if those RED nodes are online or offline. RED nodes table 1604 is useful in a system containing many RED servers (nodes) such as that shown in FIG. 17. Each record in RED nodes table 1604 includes a node_id field 1622, a name field 1624, a status field 1626, and one or more other field(s) 1628. Node_id field 1622 contains data (e.g., integer type, not NULL, auto-incrementing) that uniquely identifies a particular RED server 202. Node_id field 1622 enables particular RED connection records in table 1602 to be mapped to the RED node that those connections have been established on. Name field 1624 includes data (variable character type) of the RED server's internal name. Status field 1626 includes data (variable character type) that indicates whether the associated RED server is online or offline. As indicated in FIG. 16, there is a one-to-many relationship between node records in table 1604 and connection records in RED connections table 1602, such that each RED node record 1622 can be associated with many RED connection records 1606.

Figure 17:
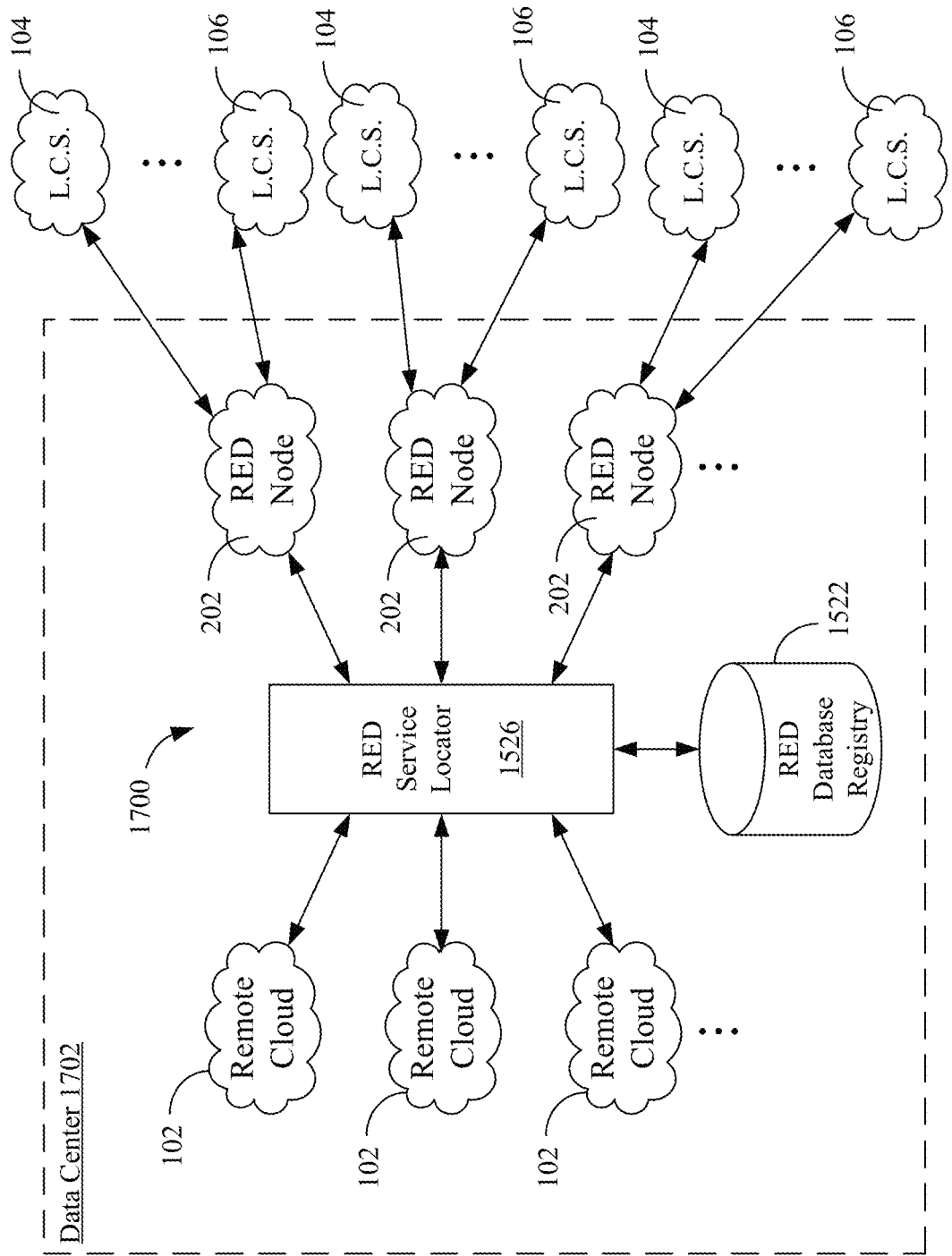
FIG. 17 shows a RED service network according to the invention.

Tables 1602 and 1604 also facilitate an extensive RED service network 1700 for a cloud computing system as shown in FIG. 17. In the embodiment shown in FIG. 17, a plurality of remote cloud servers 102 and a plurality of RED servers (nodes) 202 are located in the same data center 1702. Additionally, RED database registry 1522 and RED Service Locator (RSL) 1526 are hosted in a shared location (e.g. on a dedicated server) in the data center and can be accessed by each of remote cloud servers 102 and RED servers 202, for example, over a private network.

Each RED node 202 registers with RSL 1526, which makes an entry for that RED node 202 in RED database registry 1522 in table 1604. Similarly, each RED node 202 also registers each connection that it has established with a local cloud server 104/106 with RSL 1526. RSL 1526 makes corresponding entries for those subscribed local cloud servers in table 1602 of RED database registry 1522. Accordingly, each remote cloud server 102 can query RSL 1526 to determine which RED nodes 202 are connected to which local cloud devices 104/106. Thereafter, that remote cloud server 102 can then contact the appropriate RED node(s) 202 such that its user event messages can be delivered to the appropriate local cloud destinations.

Figure 18:
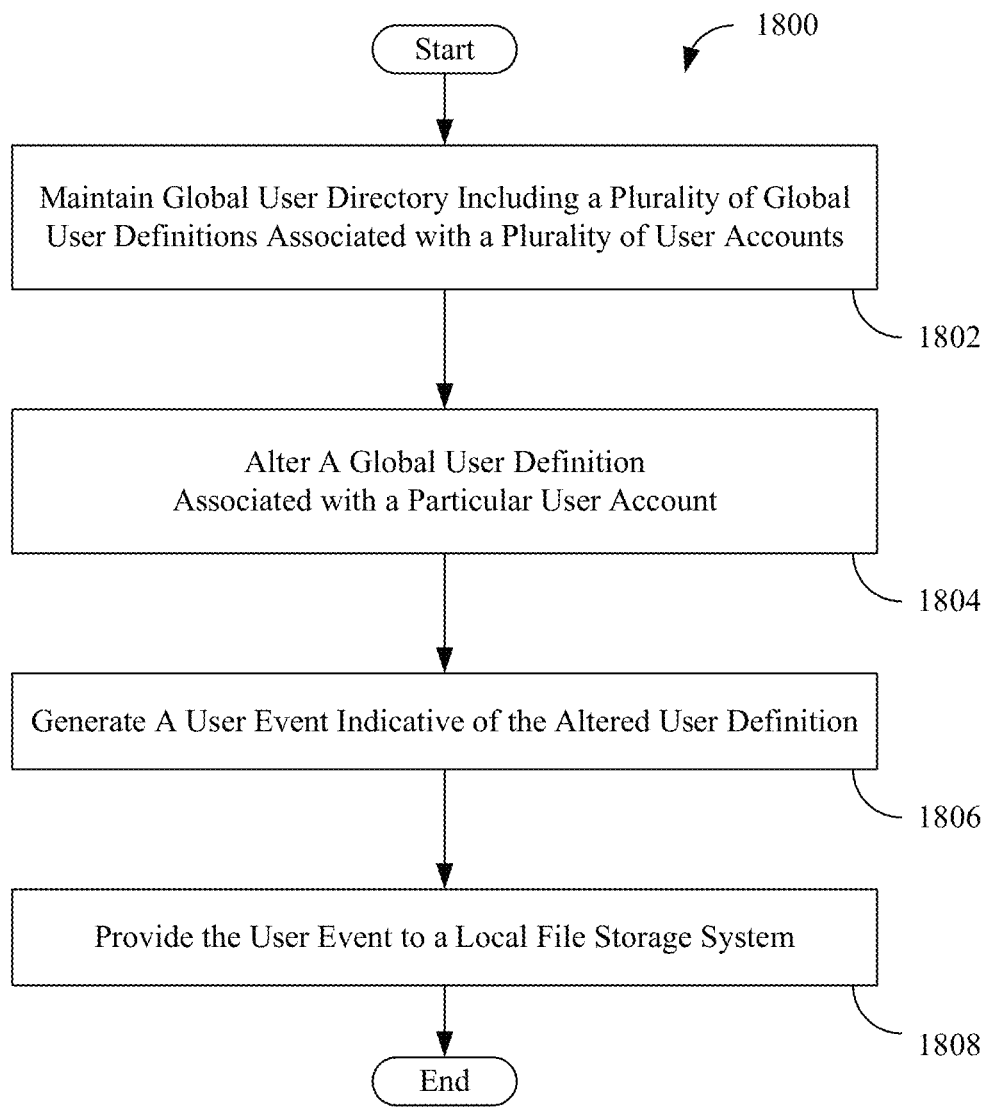
FIG. 18 is a flowchart summarizing an exemplary method for synchronizing a user definition on a remote file storage system with a user definition on an associated local file storage system according to the invention.

FIG. 18 is a flowchart illustrating an exemplary method 1800 in a remote file storage system for synchronizing the state of a global user definition on the remote file storage system and the state of a local user definition on an associated local file storage system. In a first step 1802, a global user directory is maintained. The global user directory includes a plurality of global user definitions associated with a plurality of user accounts, where each of the user accounts has access to at least one of a remote file system (RFS) hosted by the remote file storage system and a local file system (LFS) hosted by the local file storage system. In a second step 1804, a global user definition associated with a particular user account is altered. Next, in a third step 1806, a user event is generated, where the user event is indicative of the altered global user definition. Then, in a fourth step 1808, the user event is provided to the local file storage system.

Figure 19:
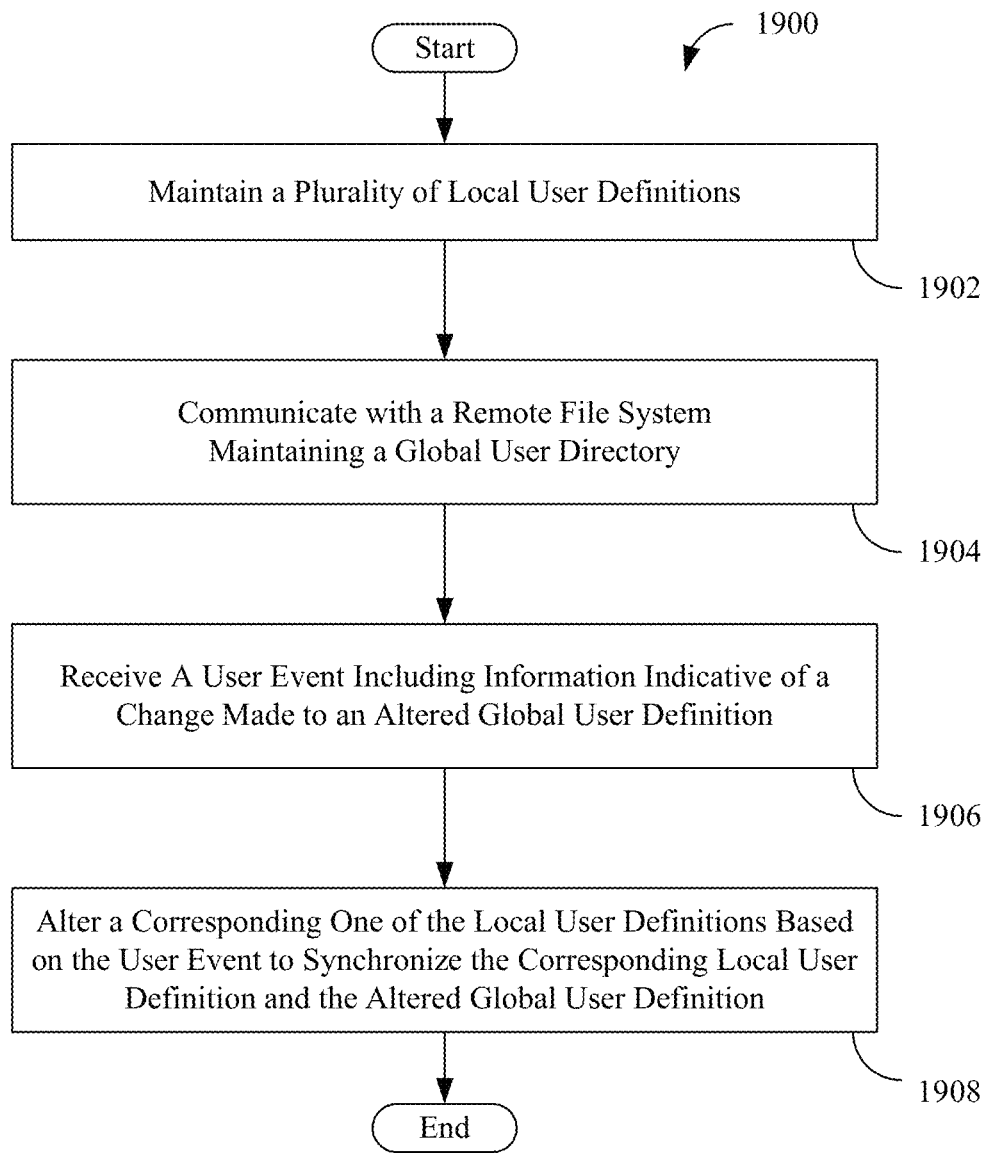
FIG. 19 is a flowchart summarizing another exemplary method for synchronizing a user definition on a local file storage system with a user definition on an associated remote file storage system according to the invention.

FIG. 19 is a flowchart illustrating an exemplary method 1900 for synchronizing the state of a local user definition on a local file storage system with a state of a global user definition on an associated remote file storage system. In a first step 1902, a plurality of local user definitions are maintained. In a second step 1904, the local file storage system communicates with the remote file storage system, which maintains a global user directory. The global user directory includes a plurality of global user definitions associated with a plurality of global user accounts, each having access to at least one of a RFS hosted by the remote file storage system and a LFS. Additionally, each of the local user definitions corresponds to one of said global user definitions. In a third step 1906, the local file storage system receives a user event including information indicative of a change made to an altered global user definition. Finally, in a fourth step 1908, a corresponding one of the local user definitions is altered, based on the user event, to synchronize the corresponding local user definition and the altered global user definition.

Figure 20:
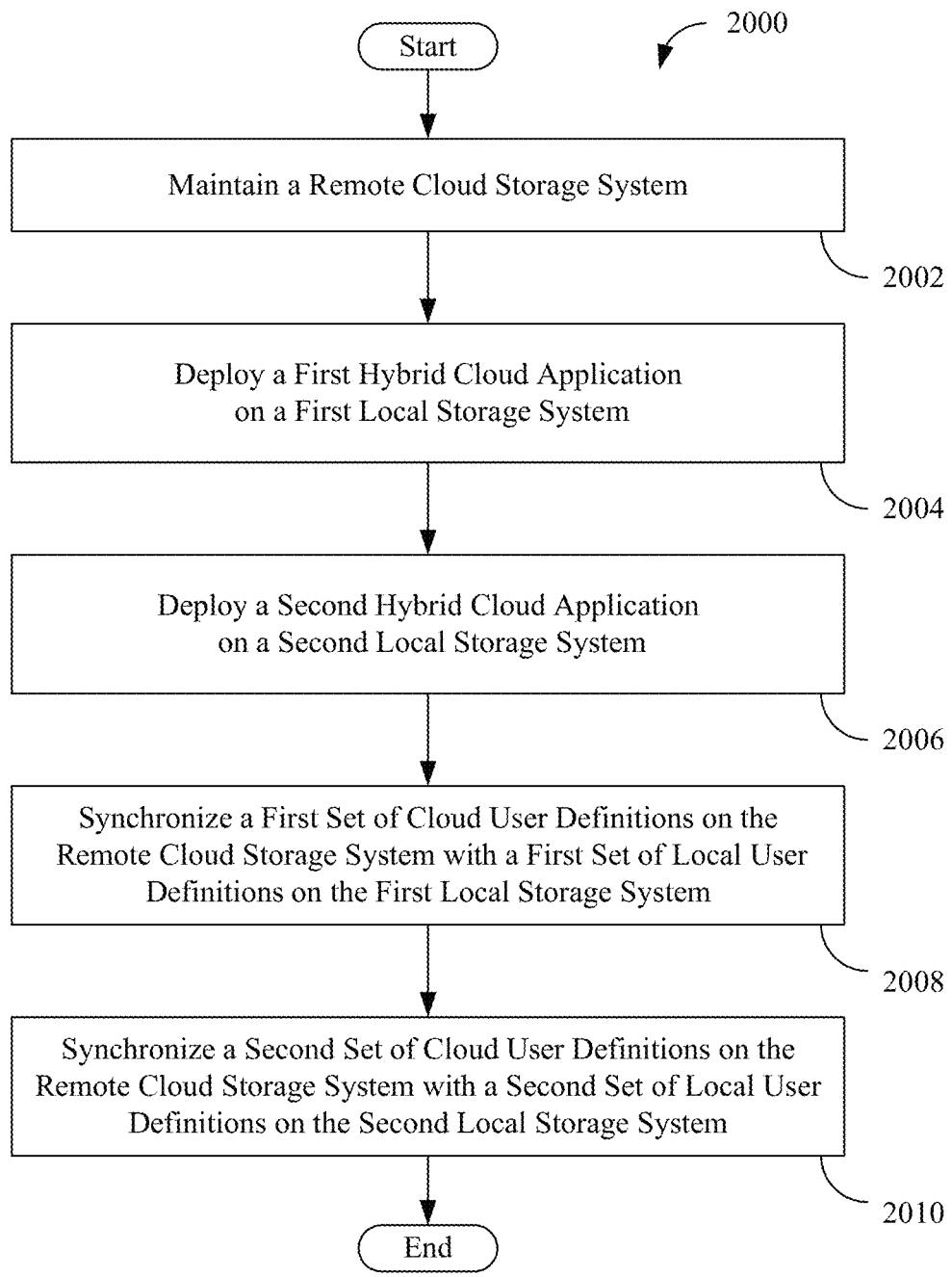
FIG. 20 is a flowchart summarizing yet another exemplary method for synchronizing user definitions among a plurality of devices in a hybrid cloud storage system.

FIG. 20 is a flowchart illustrating an exemplary method 2000 for synchronizing user states on a hybrid cloud storage system. In a first step 2002, a remote cloud storage system is maintained. In a second step 2004, a first hybrid cloud application is deployed on a first local storage system, and in a third step 2006, a second hybrid cloud application is deployed on a second local storage system. In a fourth step 2008, a first set of cloud user definitions on the remote cloud storage system is synchronized with a first set of local user definitions on the first local storage system. In a fifth step 2010, a second set of cloud user definitions on the remote cloud storage system is synchronized with a second set of local user definitions on the second local storage system.

Figure 21:
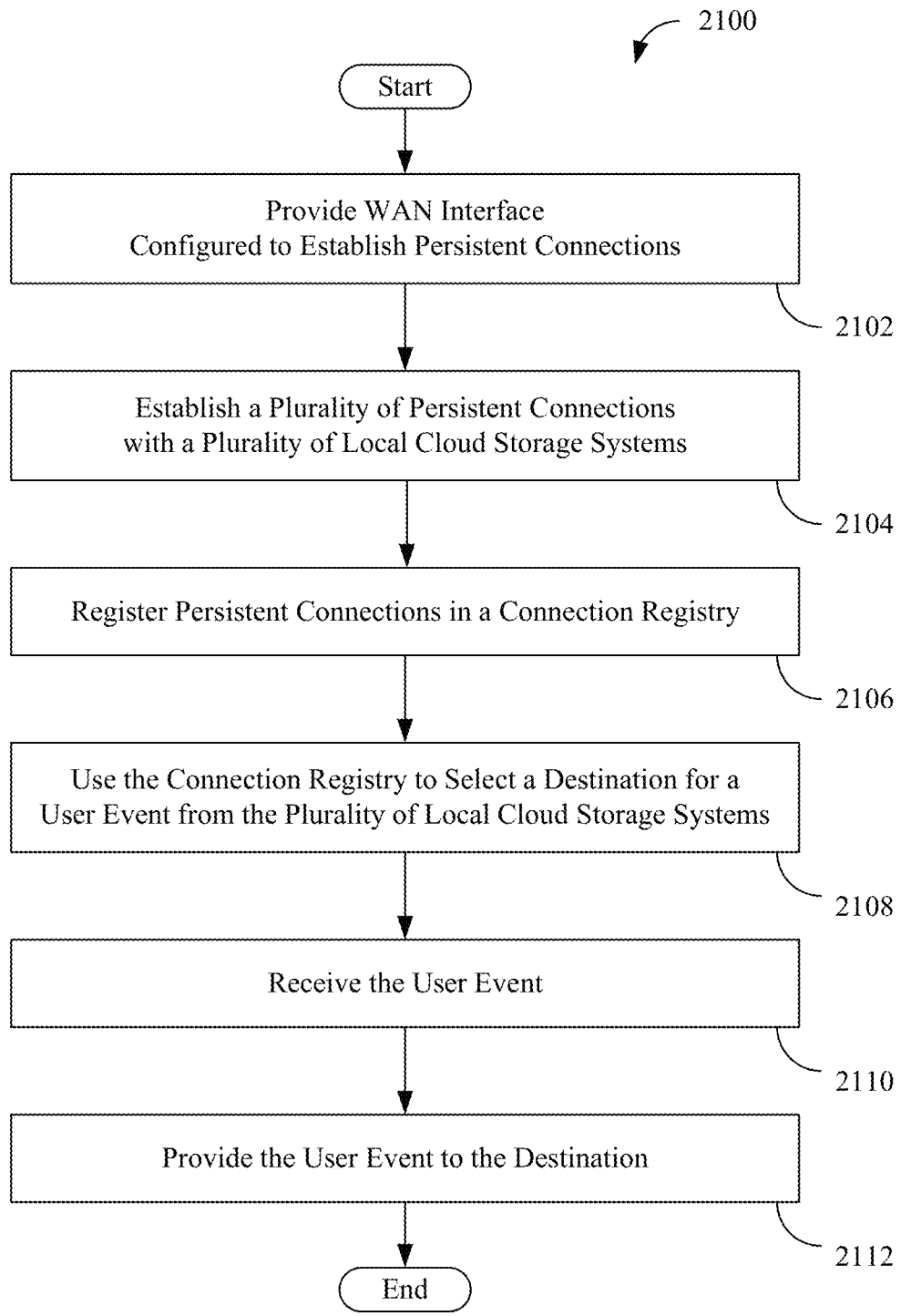
FIG. 21 is a flowchart summarizing a method for routing user events in a cloud computing system according to the invention.

FIG. 21 is a flowchart summarizing a method 2100 for routing user events in a cloud computing system. In a first step 2102, a wide area network interface is provided that is configured to establish persistent connections with a plurality of local cloud storage systems, and in a second step 2104, a plurality of persistent connections are established with the plurality of local cloud storage systems. In a third step 2106, the persistent connections are registered in a connection registry, and in a fourth step 2108, the connection registry is used to select at least one of the local cloud storage systems as a destination for a user event, where the user event is indicative of an altered cloud user definition on a remote cloud storage system. In a tenth step 2110, the user event is received and, in a sixth step 2112, the user event is provided to the destination.

The description of particular embodiments of the present invention is now complete. Many of the described features may be substituted, altered or omitted without departing from the scope of the invention. For example, alternate means of data communication (e.g., HTTP connections), may be substituted for the Web Socket connections utilized by the RED server. As another example, alternative data structures can be used in place of those shown, for example, in FIGS. 8A, 8B and 9. These and other deviations from the particular embodiments shown will be apparent to those skilled in the art, particularly in view of the foregoing disclosure.

We claim:

1. A method for synchronizing local user definitions of a local file storage system with global user definitions of a remote file storage system, said method comprising:
    maintaining a plurality of local user definitions associated with a plurality of local user accounts having access to a local file system (LFS) hosted by said local file storage system;
    capturing a local user state snapshot indicative of said local user definitions;
    communicating with said remote file storage system, said remote file storage system maintaining a global user directory comprising a plurality of global user definitions associated with a plurality of global user accounts, each of said global user accounts having access to at least one of a remote file system (RFS) hosted by said remote file storage system and said LFS, each of said local user definitions corresponding to one of said global user definitions;
    receiving a remote user state snapshot indicative of said global user definitions;
    comparing said local user state snapshot and said remote user state snapshot to identify differences between said local user definitions and said global user definitions;
    generating update information based at least in part on said differences;
    providing said update information to said remote file storage system to facilitate synchronization of said global user definitions with said local user definitions as of a first time;
    receiving a user event including information indicative of a change made to an altered global user definition after said first time; and
    altering a corresponding one of said local user definitions based on said user event to synchronize said corresponding local user definition and said altered global user definition as of a second time subsequent said first time.

2. The method of claim 1, wherein said plurality of local user accounts comprises a subset of said global user accounts.

3. The method of claim 1, further comprising:
    reading at least some headquarter (HQ) user definitions from a subscriber directory service maintained by a subscriber associated with said local file storage system; and
    providing at least some of said HQ user definitions to said remote file storage system; and wherein
    each of said local user definitions and at least some of said global user definitions correspond to ones of said HQ user definitions.

4. The method of claim 3, wherein said step of providing at least some of said HQ user definitions to said remote file storage system includes mapping said at least some of said HQ user definitions to a data structure associated with said global user definitions.

5. The method of claim 1, wherein said user event originates at said remote file storage system.

6. The method of claim 5, wherein said step of receiving said user event comprises:
establishing a persistent connection with a real time event delivery (RED) service; and
receiving said user event from said RED service.

7. The method of claim 6, further comprising:
generating a reply message responsive to receiving said user event; and
providing said reply message to said RED service.

8. The method of claim 1, further comprising:
receiving each of said local user definitions from said remote file storage system; and
storing said local user definitions on said local file storage system.

9. The method of claim 1, wherein said remote file storage system is configured to:
provide an administrator associated with said local file storage system access to said global user directory;
allow said administrator to alter one of said global user definitions stored on said remote file storage system to define said altered global user definition;
generate said user event responsive to said altered global user definition; and
provide said user event to a real time event delivery (RED) service configured to deliver said user event to said local file storage system.

10. A local file storage system configured to synchronize local user definitions of said local file storage system with global user definitions of a remote file storage system, said local file storage system comprising:
a processing unit configured to execute code;
a wide area network (WAN) adapter;
memory for storing data and said code, said data and said code including a local user directory configured to maintain a plurality of local user definitions associated with a plurality of local user accounts having access to a local file system (LFS) hosted by said local file storage system,
a local user state synchronizer configured to
capture a local user state snapshot indicative of said local user definitions,
communicate with said remote file storage system, said remote file storage system maintaining a global user directory comprising a plurality of global user definitions associated with a plurality of global user accounts having access to at least one of a remote file system (RFS) hosted by said remote file storage system and said LFS, each of said local user definitions corresponding to one of said global user definitions,
receive a remote user state snapshot indicative of said global user definitions,
compare said local user state snapshot and said remote user state snapshot to identify differences between said local user definitions and said global user definitions,
generate update information based at least in part on said differences, and
provide said update information to said remote file storage system to facilitate synchronization of said global user definitions with said local user definitions as of a first time, and
an event delivery interface configured to receive a user event including information indicative of a change made to an altered global user definition after said first time; and
wherein said local user state synchronizer is further configured to alter a corresponding one of said local user definitions based on said user event to synchronize said corresponding local user definition and said altered global user definition as of a second time subsequent said first time.

11. The system of claim 10, wherein said plurality of local user accounts comprises a subset of said global user accounts.

12. The system of claim 11, wherein at least some of said global user accounts correspond to a second plurality of local user accounts corresponding to a second local file storage system remote from said local file storage system.

13. The system of claim 12, wherein at least one of said plurality of local user accounts and at least one of said second plurality of local user accounts correspond to a same one of said plurality of global user accounts.

14. The system of claim 12, wherein said event delivery interface is configured to:
establish a WebSocket connection with a real time event delivery (RED) service; and
receive said user event from said RED service.

15. The system of claim 14, wherein said local user state synchronizer is further configured to generate a reply message responsive to applying said user event to said corresponding local user definition.

16. The system of claim 10, further comprising a headquarter (HQ) user directory exporter configured to:
read at least some HQ user definitions from a subscriber directory service maintained by a subscriber associated with said local file storage system; and
provide at least some of said HQ user definitions to said remote file storage system; and wherein
each of said local user definitions and at least some of said global user definitions correspond to ones of said HQ user definitions.

17. The system of claim 16, wherein said HQ user directory exporter is additionally configured to map said at least some of said HQ user definitions to a data structure associated with said global user definitions.

18. The system of claim 10, wherein said user event originates at said remote file storage system.

19. The system of claim 10, wherein said local user state synchronizer is configured to generate said local user definitions responsive to receiving user events from said remote file storage system.

20. The system of claim 10, wherein said plurality of local user definitions comprises:
a user definitions file including a list of said local user definitions; and
a shadow file including a list of encrypted passwords, each of said encrypted passwords corresponding to one of said local user definitions contained in said user definitions file.

* * * * *